(12) United States Patent
Cook

(10) Patent No.: US 9,760,586 B1
(45) Date of Patent: Sep. 12, 2017

(54) MULTIPLE SEARCHER USE OF SEARCH RESULT SNAPSHOT HISTORIES

(75) Inventor: Daniel B. Cook, Seattle, WA (US)

(73) Assignee: IVP Holdings III LLC, Bellevue, WA (US)

( * ) Notice: Subject to any disclaimer, the term of this patent is extended or adjusted under 35 U.S.C. 154(b) by 720 days.

(21) Appl. No.: 13/208,288

(22) Filed: Aug. 11, 2011

(51) Int. Cl.
G06F 17/30 (2006.01)

(52) U.S. Cl.
CPC .. *G06F 17/30312* (2013.01); *G06F 17/30395* (2013.01)

(58) Field of Classification Search
None
See application file for complete search history.

(56) References Cited

U.S. PATENT DOCUMENTS

| | | | |
|---|---|---|---|
| 4,972,349 A | | 11/1990 | Kleinberger |
| 5,574,898 A | * | 11/1996 | Leblang et al. |
| 6,298,327 B1 | | 10/2001 | Hunter et al. |
| 6,526,440 B1 | | 2/2003 | Bharat |
| 6,662,178 B2 | | 12/2003 | Lee |
| 6,694,331 B2 | | 2/2004 | Lee |
| 7,096,218 B2 | | 8/2006 | Schirmer et al. |
| 7,464,108 B1 | | 12/2008 | Sorensen et al. |
| 7,716,226 B2 | | 5/2010 | Barney |
| 2001/0038394 A1 | * | 11/2001 | Tsuchimura et al. ......... 345/811 |
| 2002/0035499 A1 | | 3/2002 | Germeraad et al. |
| 2002/0035573 A1 | | 3/2002 | Black et al. |
| 2002/0042784 A1 | | 4/2002 | Kerven et al. |
| 2002/0059076 A1 | | 5/2002 | Grainger et al. |
| 2004/0073443 A1 | | 4/2004 | Gabrick et al. |
| 2004/0236729 A1 | | 11/2004 | Dingledine et al. |
| 2005/0278633 A1 | | 12/2005 | Kemp |
| 2006/0069809 A1 | | 3/2006 | Serlet |
| 2006/0173703 A1 | | 8/2006 | Lee |
| 2008/0120278 A1 | | 5/2008 | Roe et al. |
| 2008/0275899 A1 | | 11/2008 | Baluja et al. |
| 2010/0211578 A1 | | 8/2010 | Lundberg et al. |

(Continued)

OTHER PUBLICATIONS

User's Manual for the Examiners Automated Search Tool (EAST) 2.0 Nov. 3, 2003, Computer Sciences Corporation, Version 1.1, all.*

(Continued)

*Primary Examiner* — Jason Liao
(74) *Attorney, Agent, or Firm* — Ellen M. Bierman; Lowe Graham Jones PLLC

(57) ABSTRACT

Methods, systems, and techniques for managing and using search result snapshot histories are provided. Some examples provide a Search Snapshot Management Engine ("SSME"), which enables users and or programs through the use of an application programming interface ("API") to define and manipulate search result snapshots. In typical operation, an iteration of a search result is associated with a search result snapshot history. In some examples, the SSME may be used to provide search histories to teams for reviewing patent related publications and other types of literature. In some examples, the SSME promotes cooperative sharing of search result snapshot histories. In other examples, the SSME promotes competitive sharing of search result snapshot histories. One or more designated snapshots may be used to create new or merged search result snapshot histories.

49 Claims, 36 Drawing Sheets

(56) References Cited

U.S. PATENT DOCUMENTS

2011/0191310 A1  8/2011  Liao et al.
2012/0123974 A1  5/2012  Powell, Jr. et al.

OTHER PUBLICATIONS

Patent Application Information various, but features verified as of Dec. 12, 2006, http://portal.uspto.gov/external/portal/!ut/p/c5/04_SB8K8xLLM9MSSzPy8xBz9CP0os3hff1NDc1NLYwN3SzcDA08PwyD_YF8zlNcYKB-JW97AiCLdBgR0h4Nci992v PIGEHkDHMDRQN_Plz83Vb8gNzTCIDMgHQCGKKj-/dl3/d3/L0IDU0IKSWdrbUNTUS9JUFJBQUIpQ2dBek15cXpHWUEhIS 80QkVqOG8wRmxHaXQtYlhwQUh0Qi83X01.* eRedFolder: Training Manual for Examiners, Primary Examiners and SPEs Dec. 7, Search and Information Resources Administration, all.*

Just_n_examiner, New Examiner Performance Appraisal Plans, Oct. 20, 2010, http://just-n-examiner.livejournal.com/46162.html.*

Popanews: Pay Agreement FAQs: How does the new agreement affect overtime? Jan. 1, pp. 1-6.*

Federal Employees, 2009 [Copyright date 2009], Asbury Park Press, http://php.app.com/fed_employees/search09.php.*

Manual of Patent Examining Procedure Jul. 8, US Patent and Trademark Office, 8th ed. Rev. 7, all (only chapters 700 and 900 included in mailing.*

Howe, node [unknown, but copyright date is 2010] [accessed on Aug. 28, 2013], Free On-Line Dictionary of Computing, http://foldoc.org/node.*

Howe, data structure Sep. 11, 2003, Free On-Line Dictionary of Computing, http://foldoc.org/data+structure.*

Definition of node in English [unknown] [Accessed on Aug. 27, 2013], Oxford Dictionaries, http://oxforddictionaries.com/us/definition/american_english/node.*

Definition of object [date unknown] [Accessed on Aug. 31, 2013], WordNet, 3.1, http://wordnetweb.princeton.edu/perl/webwn?s=object&sub=Search+WordNet.*

David Kappos, Director's Forum: A Blog from USPTO's Leadership, Working Through Snowmageddon Feb. 12, 2010, USPTO, http://www.uspto.gov/blog/director.*

QEM Affidavit Aug. 29, 2013, USPTO, 1 page.*

Delphion Subscription Alert, available at http://www.delphion.com/citelink/clapp?pn=US07440934_, last accessed Dec. 5, 2013.

Tenenbaum et al., "Data Structures Using Pascal," Prentice-Hall, Inc., Englewood Cliffs, New Jersey, 1981, pp. 207, 208, 293 and 358.

Knuth, Donald, "The Art of Computer Programming," Second Edition, Addison-Wesley Publishing Company, Inc., United States, 1973, pp. 278, 279, 305, 306, 352-356 and 423.

Quinn, Gene, "Patent Searching 102: Using Public PAIR," IPWatchdog.com, available at http://www.ipwatchdog.com/2010/08/21/patent-searching-102-using-public-pair, downloaded Jan. 17, 2013.

Quick Reference Guide for West and East.

DWPI Classification System—IP & Science—Thomson Reuters available at http://ip-science.thompsonreuters.com/support/patents/dwpire/reftools/clas . . . , downloaded Dec. 20, 2012.

Parasuramam et al., "A Model for Types and Levels of Human Interaction with Automation," IEEE Transactions on Systems, Man, and Cybernetics—Part A: Systems and Humans, vol. 30, No. 3, May 2000, pp. 286-297.

Federal Register, vol. 75, No. 169, Wednesday, Sep. 1, 2010, Notices, pp. 53643-53660.

Knuth, The Art of Computer Programming,: Addison-Wesley, 1998, Cover page and TOC.

Howe, relevance from FOLDOC Apr. 9, 1997, Free On-Line Dictionary of Computing, http://foldoc.org/relevance.

* cited by examiner

Home /
Virtual world property disposition after real-world...

| Invention Disclosure | Disclosure Literature Search Tools |

IVIN's Literature Search Tools help you decide whether existing works or technologies are similar to what is described in this invention disclosure. For help, please visit this page.

| Search | Keywords (27) | Categories (1) | Patents (10) |

Found Categories | Your Tagged Categories (3) (use for refining your search)
Tag the categories below to use it to refine your search ⌐ 285

| Code | Description | | |
|------|-------------|---|---|
| | Finance (e.g., banking, investment or credit) | DATA PROCESSING: FINANCIAL, BUSINESS PRACTICE, MANAGEMENT, OR COST/PRICE DETERMINATION / | View |
| 705/35 | | AUTOMATED ELECTRICAL FINANCIAL OR BUSINESS PRACTICE OR MANAGEMENT ARRANGEMENT / | |

⌐ 284

Reset your search OR Use your tagged items to refine your search

*Fig. 2P*

Home /
Virtual world property disposition after real-world...

| Invention Disclosure | Disclosure Literature Search Tools |

IVIN's Literature Search Tools help you decide whether existing works or technologies are similar to what is described in this invention disclosure. For help, please visit this page.

221d

287 | Search | Keywords (27) | Categories (1) | Patents 100 |

Found Patents | Your Tagged Patents (10) (use for refining your search)
Tag the patents below to use it to refine your search

| Patent No. | Title | | |
|---|---|---|---|
| 20070013692 | Third party control over virtual world characters | Tag | View |
| 20080092065 | Third party control over virtual world characters | Tag | View |
| 20090106673 | Third party control over virtual world characters | Tag | View |
| 20090100354 | Third party control over virtual world characters | Tag | View |
| 20070073582 | Real-world incentives offered to virtual world participants | Tag | View |
| 20070156509 | Real-world incentives offered to virtual world participants | Tag | View |
| 20070203828 | Real-world incentives offered to virtual world participants | Tag | View |
| 20070038559 | Rating notification for virtual world environment | Tag | View |
| 20070024613 | Selecting auxiliary control features for virtual world environment | Tag | View |
| 20060235790 | Participation profiles of virtual world players | Tag | View |
| 20090037364 | Participation profiles of virtual world players | Tag | View |
| 20090125383 | Participation profiles of virtual world players | Tag | View |
| 20090099930 | Participation profiles of virtual world players | Tag | View |
| 20060178975 | Attribute enhancement in virtual world environments | Tag | View |
| 20070268299 | Attribute enhancement in virtual world environments | Tag | View |
| 20090144148 | Attribute enhancement in virtual world environments | Tag | View |
| 20060235791 | Follow-up contacts with virtual world participants | Tag | View |

| | | | |
|---|---|---|---|
| Search | Keywords(25) | Categories(21) | Patents 100 |

Found Patents | Your Tagged Patents (8) (use for refining your search)
Tag the patents below to use it to refine your search

291

| Patent No. | Title | | |
|---|---|---|---|
| 20060195376 | Compensation techniques for virtual credit transactions | Untag | View |
| 20060195378 | Hybrid charge account for virtual world credit | Tag | View |
| 20060195377 | Financial ventures based on virtual credit | Tag | View |
| 20070078737 | Financial ventures based on virtual credit | Tag | View |
| 20060229976 | Virtual credit with transferability | Untag | View |
| 20070150986 | Virtual credit with transferability | Untag | View |
| 20070168214 | Virtual credit with transferability | Untag | View |
| 20070198305 | Virtual credit with transferability | Untag | View |
| 20060224505 | Multi-player game using simulated credit transactions | Untag | View |
| 20070124239 | Multi-player game using simulated credit transactions | Untag | View |
| 20060195394 | Payment options for virtual credit | Tag | View |
| 20070013692 | Third party control over virtual world characters | Tag | View |
| 20080092065 | Third party control over virtual world characters | Tag | View |
| 20090106673 | Third party control over virtual world characters | Tag | View |
| 20090100354 | Third party control over virtual world characters | Tag | View |
| 20060178985 | Virtual credit in simulated environments | Tag | View |
| 20080103951 | Virtual credit in simulated environments | Tag | View |
| 20080177650 | Virtual credit in simulated environments | Tag | View |
| 20080126234 | Virtual credit in simulated environments | Tag | View |
| 20080109338 | Virtual credit in simulated environments | Tag | View |
| 20070038559 | Rating notification for virtual world environment | Tag | View |
| 20070024613 | Selecting auxiliary control features for virtual world environment | Tag | View |
| 20070073582 | Real-world incentives offered to virtual world participants | Tag | View |
| 20070156509 | Real-world incentives offered to virtual world participants | Tag | View |
| 20070203828 | Real-world incentives offered to virtual world participants | Tag | View |

*Fig. 2S*

| | | |
|---|---|---|
| 2009/0043682 | Real-world profile data for making virtual world contacts | Tag View |
| 2008/0178968 | Virtual world interconnection technique | Tag View |
| 2009/0189 10 | Virtual world interconnection technique | Tag View |
| 2007/0072614 | Real world interaction with virtual world privileges | Tag View |
| 2008/0215424 | Real world interaction with virtual world privileges | Tag View |
| 2007/0088656 | Virtual world property disposition after real-world occurrence | Tag View |
| 2008/0270165 | Virtual world property disposition after real-world occurrence | Tag View |
| 2008/0178966 | Virtual world property disposition after virtual world occurrence | Tag View |
| 2007/0203817 | Virtual collateral for real-world obligations | Tag View |
| 2007/0106576 | Disposition of component virtual property rights | Tag View |
| 2009/0043604 | Disposition of component virtual property rights | Tag View |
| 2006/0178970 | Virtual world reversion rights | Tag View |
| 2009/0043683 | Virtual world reversion rights | Tag View |
| 2006/0178967 | Disposition of proprietary virtual rights | Tag View |
| 2007/0112660 | Disposition of proprietary virtual rights | Tag View |

292 (Same Title as Disclosure)

| Patent_ID | Related Patent_ID | # Unique Citation Paths * | | Explanatory: Citation Paths |
|---|---|---|---|---|
| 2 | X | 2 | | X:2, X:C:2, |
| 2 | W | 2 | | W:2, W:C:2 |
| 2 | 1 | 3 | | 1:C:2, 1:X:2, 1:Y:2 |
| 2 | Y | 1 | | Y:2, |
| 2 | D | 1 | | D:X:2 |
| 2 | C | 3 | | C:2, C:X:2, C:W:2 |
| 2 | 3 | 2 | | 3:X:2, 3:Y:2 |
| 1 | D | 2 | | D:1, D:X:1 |
| 1 | X | 2 | | X:1, X:D:1 |
| 1 | Y | 1 | | Y:1 |
| 1 | C | 2 | | C:1, C:X:1 |
| 1 | 2 | 3 | | 2:X:1, 2:C:1, 2:Y:1 |
| 1 | 3 | 2 | | 3:X:1, 3:Y:1 |
| ... | ... | ... | | ... |
| W | 2 | 2 | | 2:W, 2:C:W |
| W | C | 2 | | C:W, C:2:W |
| E | 3 | 1 | | 3:E |
| E | Y | 1 | | Y:3:E |
| E | X | 1 | | X:3:E |

* This example uses only direct citations, or 1-level indirection

MULTIPLE SEARCHER USE OF SEARCH RESULT SNAPSHOT HISTORIES

TECHNICAL FIELD

The present disclosure relates to methods, techniques, and systems for searching and, in particular, to methods, techniques, and systems for sharing search result snapshot histories.

BACKGROUND

Access through online methods, such as through use of the Internet, has enabled inventors, researchers, technology transfer personnel, asset valuators, patent agents and attorneys, and the like, to access an abundance of information, including scientific literature, patents, and patent applications previously very difficult to obtain. However, as the corpus of this information has grown, it has become increasing difficult to search the morass of information efficiently, for example, to verify that an invention is a new concept, to perform due diligence before purchasing patent assets, to search for language when drafting claims in a patent application, or the like. Thus, reliance on electronic search tools for performing such searches has increased. It is no longer the case that it is sufficient to hire someone to physically go into, for example, the United States Patent and Trademark Office (USPTO) to mimic searches typically performed by Examiners. Much scientific and general literature is available through other non-USPTO sources and, with the corpus of patents and patent applications increasing dramatically each year, it has become more and more difficult to indicate even to professional searchers what language, e.g., keywords, claims, text, etc., to use to facilitate searches. Many electronic search systems provide rudimentary keyword matching functions that require professionals to formulate search strategies through experience and trial-and-error.

In addition, the continued rise of business entities, including non-practicing ones, that wish to acquire, enforce, or otherwise monetize large portfolios of patents and other intellectual property (IP) assets, has sparked the need to evaluate on an ongoing basis a large number of patent disclosures, patents, patent applications, and other patent related assets to determine their value, validity, and the like.

BRIEF DESCRIPTION OF THE DRAWINGS

FIG. 3 is an example screen display of an excerpt from the United States Patent and Trademark Office classification taxonomy that is used by an example Patent Related Publication Search Engine.

FIG. 4A is an example screen display of an example user interface for scoring asset disclosures.

FIG. 12 is an example table illustrating an excerpt of the citation analysis that may be performed upon the relationships of assets demonstrated in FIG. 11.

DETAILED DESCRIPTION

Figure 1:
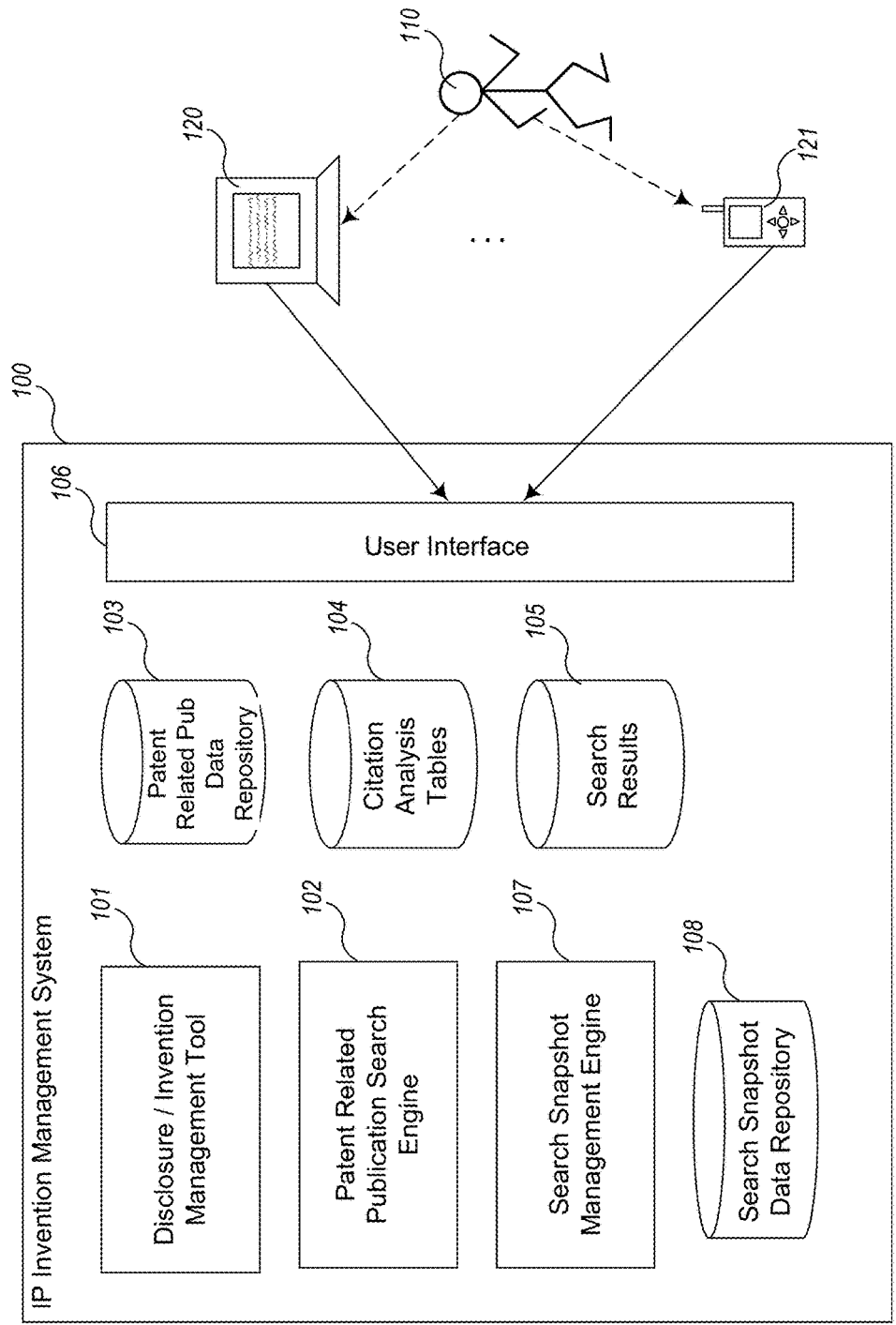
FIG. 1 is an example block diagram of components of an example IP Invention Management System that includes an example Patent Related Publication Search Engine and related tools and repositories.

Examples described herein provide enhanced computer- and network-based methods, techniques, and systems for searching for patent related literature, such as issued or granted patent publications, patent application publications, statutory invention registration publications, and patent abstracts, for example, those provided by patent offices whose patent related publications publish in languages other than English. The term "patent related publications" as used herein refers to all such publications and literature, and any type of publications to be developed in the future, electronic, paper, or otherwise, that can be used, for example, to assess the patentability, marketability, or valuation of an idea, disclosure, patent application, and the like. Such publications and/or documents may be used, for example, to determine that, because of the presence of one or more "close" publications or in a crowded field where much has been published, an allegedly inventive idea is likely unpatentable or may be difficult to pursue through a patent office before a business entity (or individual or any other type of entity) invests much in the idea. Also, such publications and/or documents may be used to assess the financial value of an existing patent related asset before, for example, an entity spends money to buy an asset with diminished value. Similarly, such documents may constitute useful prior art in a litigation related proceeding.

Some examples provide a Patent Related Publication Search Engine ("PRPSE"), which enables users and or programs through the use of an application programming interface ("API") to iteratively find patent related publications, such as those listed above. In typical operation, based upon input text, such as free form text, an invention disclosure or idea write-up, an abstract, title, claims, a full text patent or patent application, a patent number, a patent publication number, a patent classification code, an inventor indication, an assignee indication, attorney or agent related information or the like, the PRPSE determines predominant keywords found in the input text and locates a set of patent related publications most closely related to these determined keywords as search results. In some examples, the predominant keywords may be determined by a variety of algorithms including, for example, some number of the most frequent keywords or the ones found most proximate to each other in the input text. Keywords may be single words or phrases of words. In one example, nouns and noun phrases are employed. In some other examples, acronyms and/or proper names are detected. In some examples, the PRPSE determines the set of patent related publications most closely related to these determined keywords both by full text searching of a corpus of patent related publications for all of the patent related publications that contain the predominant keywords AND by finding all correlated patent related publications through a process known as citation analysis.

Citation analysis is the process of locating similar patent related publications by examining the backward citations of an issued or granted patent publication to other patents or patent application publications. These citations are generated typically during the examination process by incorporating the references cited by a patent applicant in, for example, information disclosure statements (to the USPTO) and the references found and cited by an Examiner during the examination process. Although the following examples are described with reference primarily to the United States patent system, the techniques are extensible to other patent related publications in other countries and to other non-United States implementations. In some examples, the cross-reference section (incorporation of patents or patent applications in a related application chain) is also examined during citation analysis. A forward citation can be understood to be useful as well—once a later patent or patent application cites back to an earlier publication then, effectively, the earlier publication can be said to have a forward reference to the later patent or patent application. Examples of citation analysis are provided below with reference to FIGS. 11 and 12.

In some examples, the PRPSE provides an interface for iteratively determining revised sets of patent related publications based upon one or more keywords a user tags or otherwise inputs to the PRPSE and/or one or more patent related publications previously indicated as search results by the PRPSE that the user tags as interesting or otherwise inputs to the system. In some examples, the PRPSE supplements the search results by suggesting related keywords (found, for example, in the patent related publications) and/or categories (classifications, taxonomies, or the like) found in the patent related publications. The user can then use the suggested related keywords (as well as the found keywords), the categories, and/or the resultant patent related publications to indicate sources of interest for subsequent iterations of the PRPSE.

FIG. 1 is an example block diagram of components of an example IP Invention Management System that includes an example Patent Related Publication Search Engine and related tools and repositories. In one example, the IPIMS 100 comprises one or more functional components/modules that work together to provide search tools for patent related publications, as described herein. An example IP Invention Management System ("IPIMS"), such as IPIMS 100, may be used, for example, by a business entity, for example, one operating the IPIMS 100, that desires to have a multitude of users review, rate, and categorize invention disclosures, by an inventor desiring to find similar prior art to what she or he is inventing before submission to the business entity or to a patent office, by a patent preparation person looking for language to use in preparing claims, or by a financial entity using the IPIMS 100 to manage and evaluate IP assets. Other similar users and uses abound.

An example IPIMS 100 comprises a disclosure/invention management tool for organizing input; a patent related publication search engine (PRPSE) 102, such as described above; and a search snapshot management engine 107 for tracking, managing, and/or distributing snapshots of search sessions, for example, to share a review and rating project amongst a group of users or, for example, to allow an individual to store and use previous search results for later searches. Details of example logic for an example PRPSE 102 are described with reference to FIGS. 8-10 below. Example IPIMS 100 further comprises a patent related publication data repository 103 for storing a corpus of patent related publications; citation analysis tables data repository 104 for storing and managing citation tables for a set of patent related publications; search results data repository 105 for storing and managing the results of searches computed using the PRPSE; and search snapshot data repository 108 for storing and managing the data supporting the search snapshot capabilities. In some example IPIMS 100 environments, one or more of the data repositories 103, 104, 105, and 108 may be located remotely in part or in whole and/or may be operated by a third party distinct from the entity that operates the IPIMS 100. For example, in some example IPIMS 100 environments, the patent related publication data repository 103 may comprise the entire corpus of USPTO patent related publications operated by the USPTO itself or another third party or some other corpus of documents. Also, in some example IPIMS 100 environments, the citation analysis table 104 is pre-computed or otherwise predetermined and updated when a patent publication issues. A predetermined citation table 104 allows for greater efficiency when the PRPSE determines correlated patent related publications.

Example IPIMS 100 environments may be implemented as a server, server computing system, and/or service and may available through user interface 106 to a user 110 or client application (not shown) through the use of a client computing device, such as computer system 120 or mobile device 121. An example user interface for interacting with an example IPIMS 100 and example PRPSE 102 is described below with respect to FIGS. 2A-2V. Other user interfaces and API may be incorporated. In some environments, the services of the IPIMS 100 are made available remotely to users 110 or applications via a network or other such communications medium. In other environments, both the server and client side portions of the IPIMS 100 reside locally.

Figure 2A:
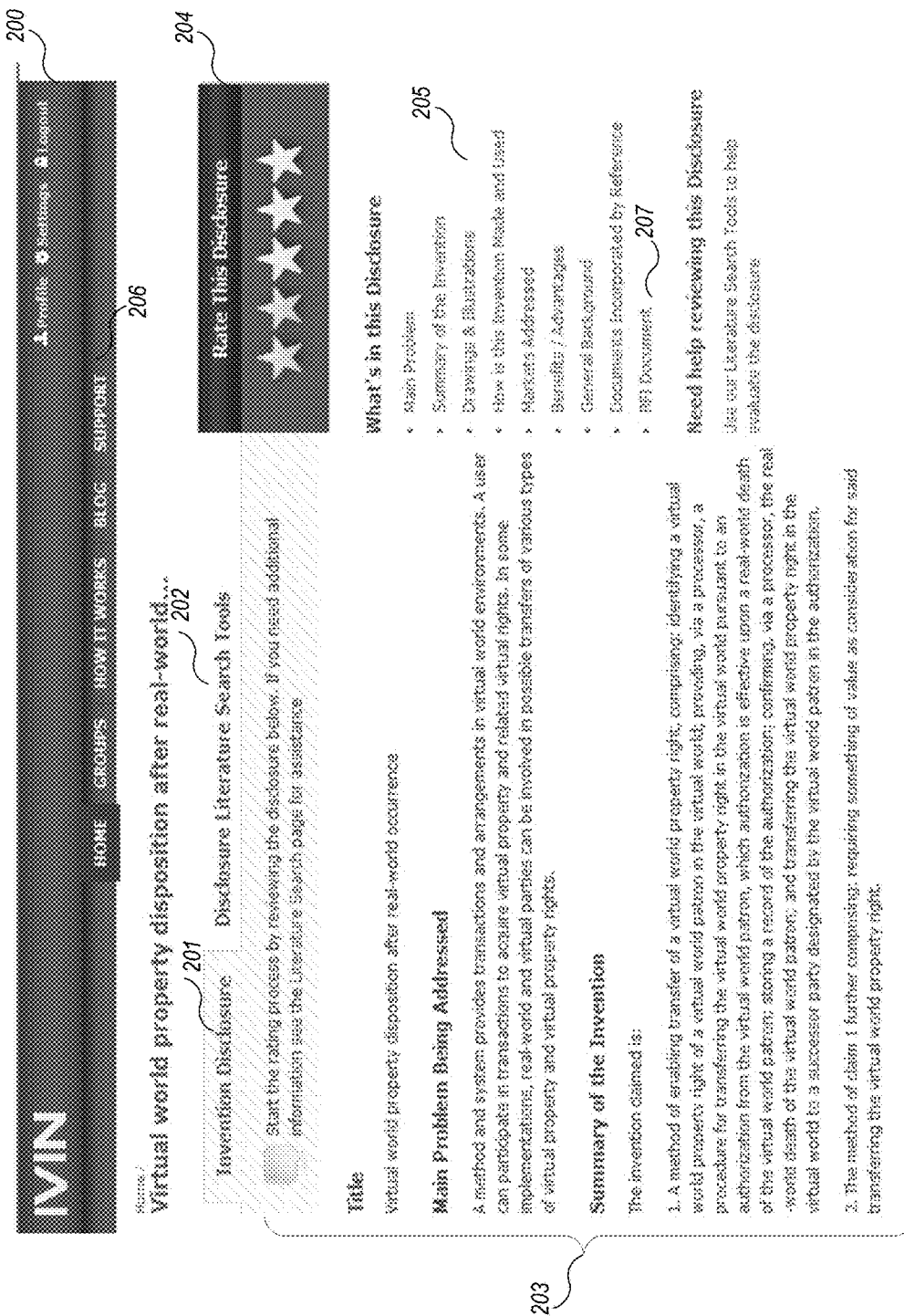
FIGS. 2A-2V are example screen displays from an example IP Invention Management System and an example Patent Related Publication Search Engine user interface for locating patent related literature using iterative searching and citation analysis.
Figure 2B:
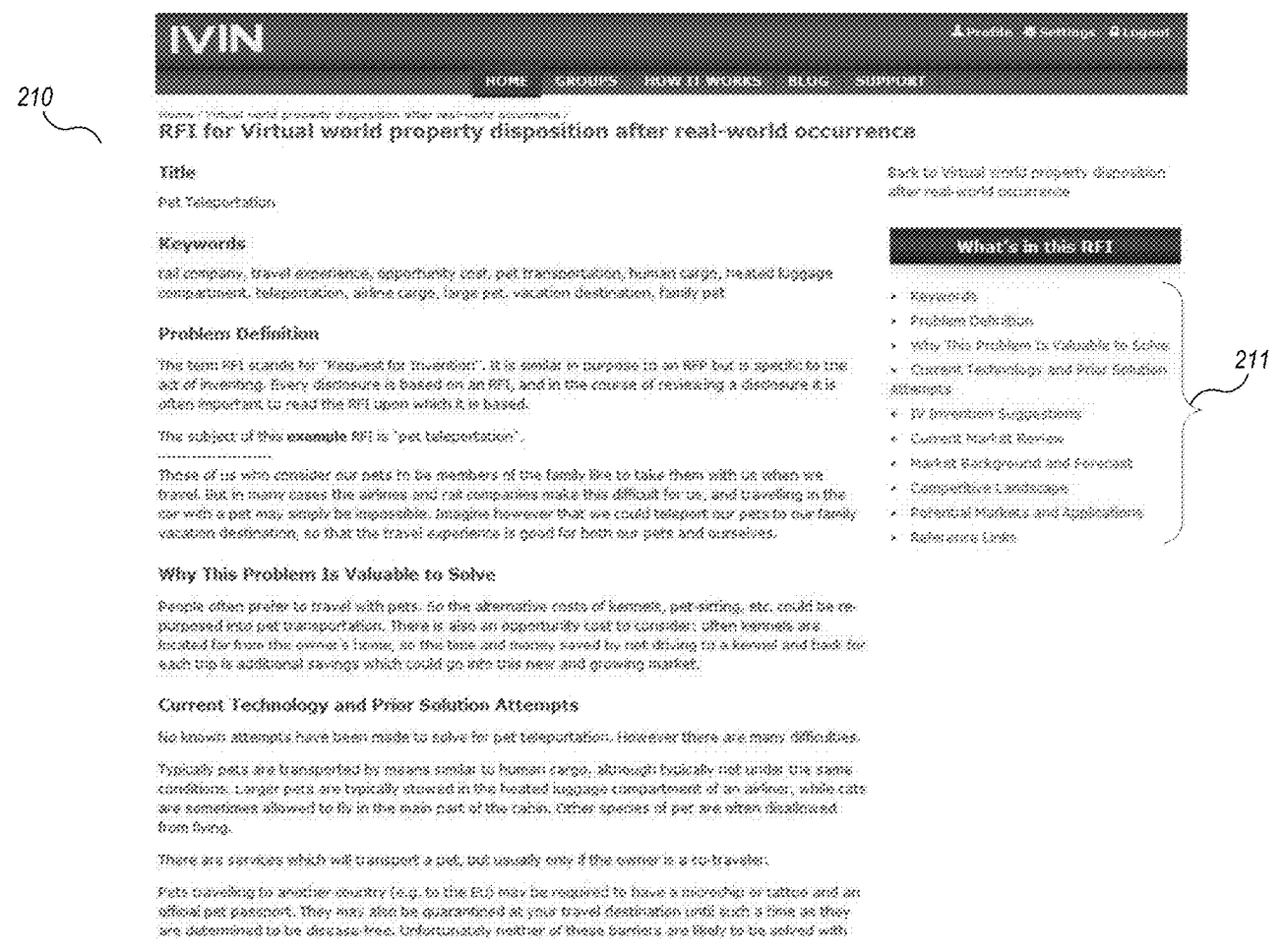
Figure 2C:
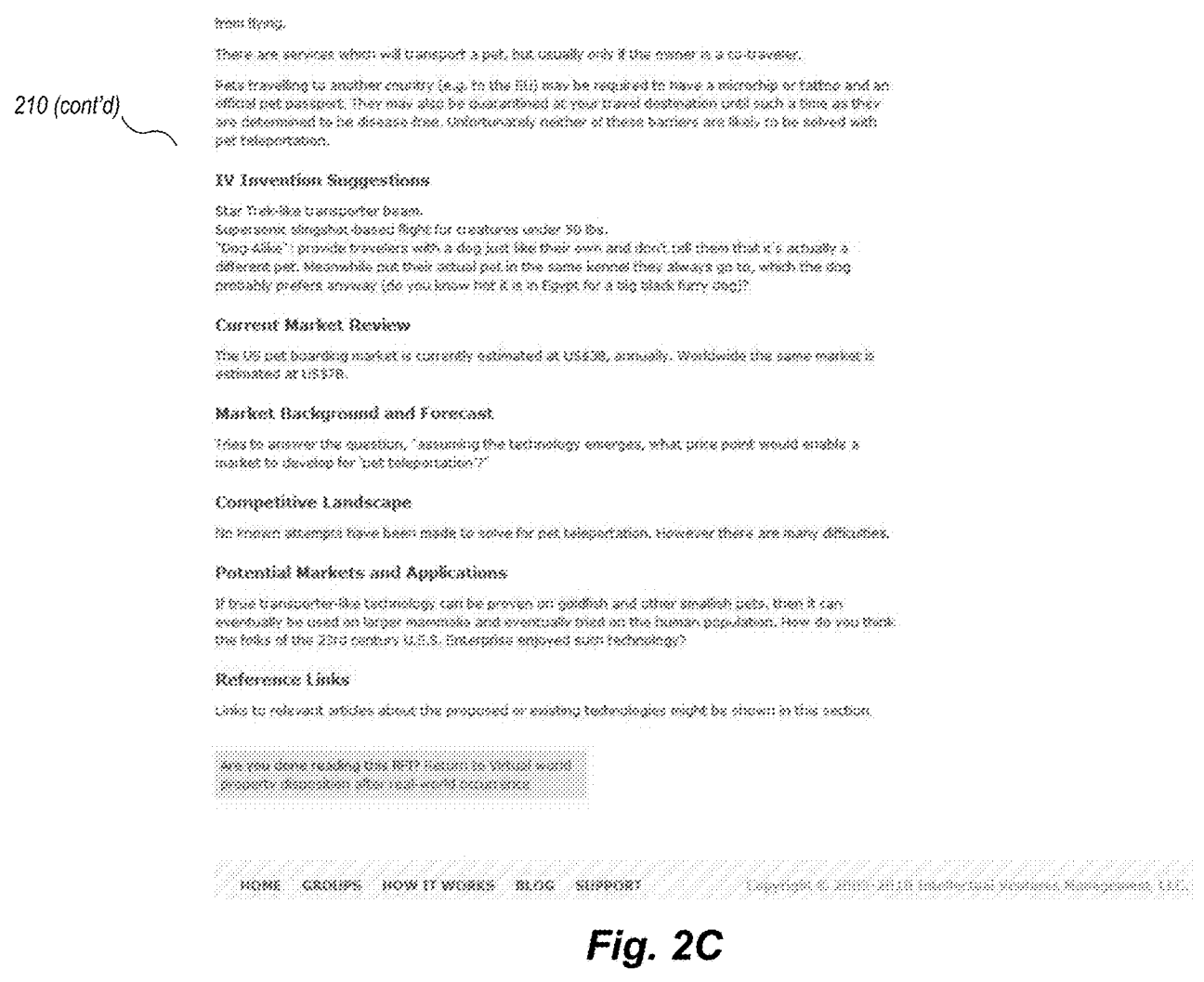
Figure 2D:
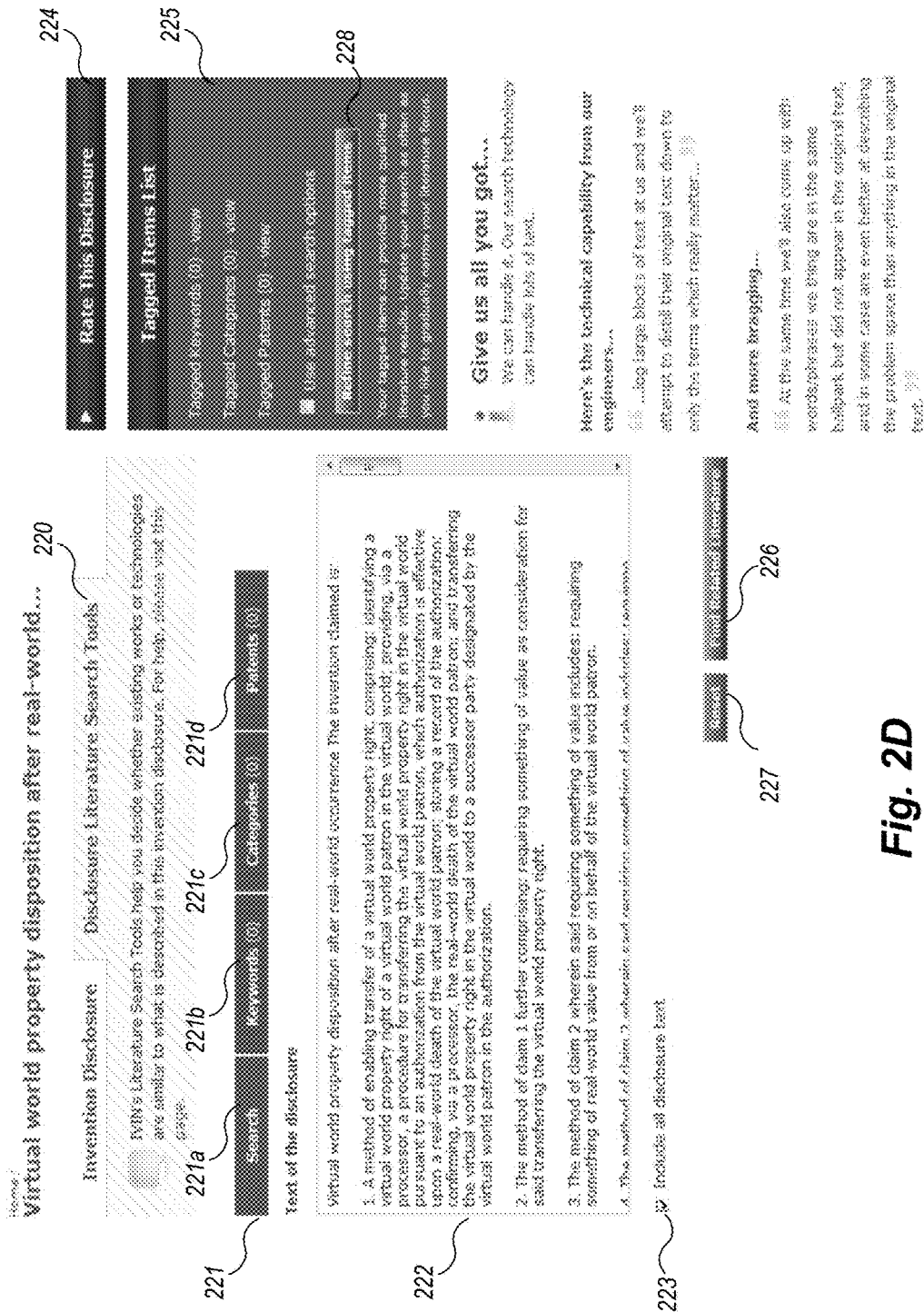
Figure 2E:
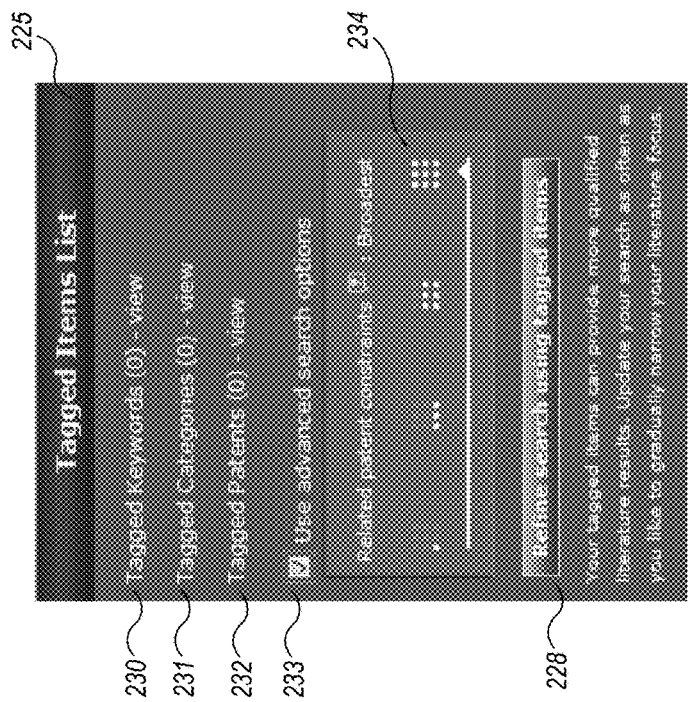
Figure 2F:
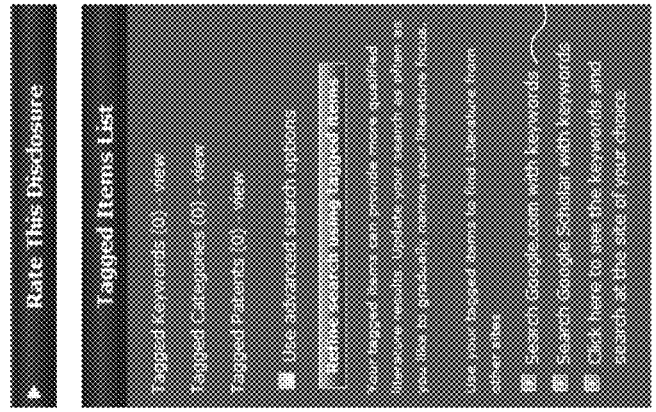
Figure 2G:
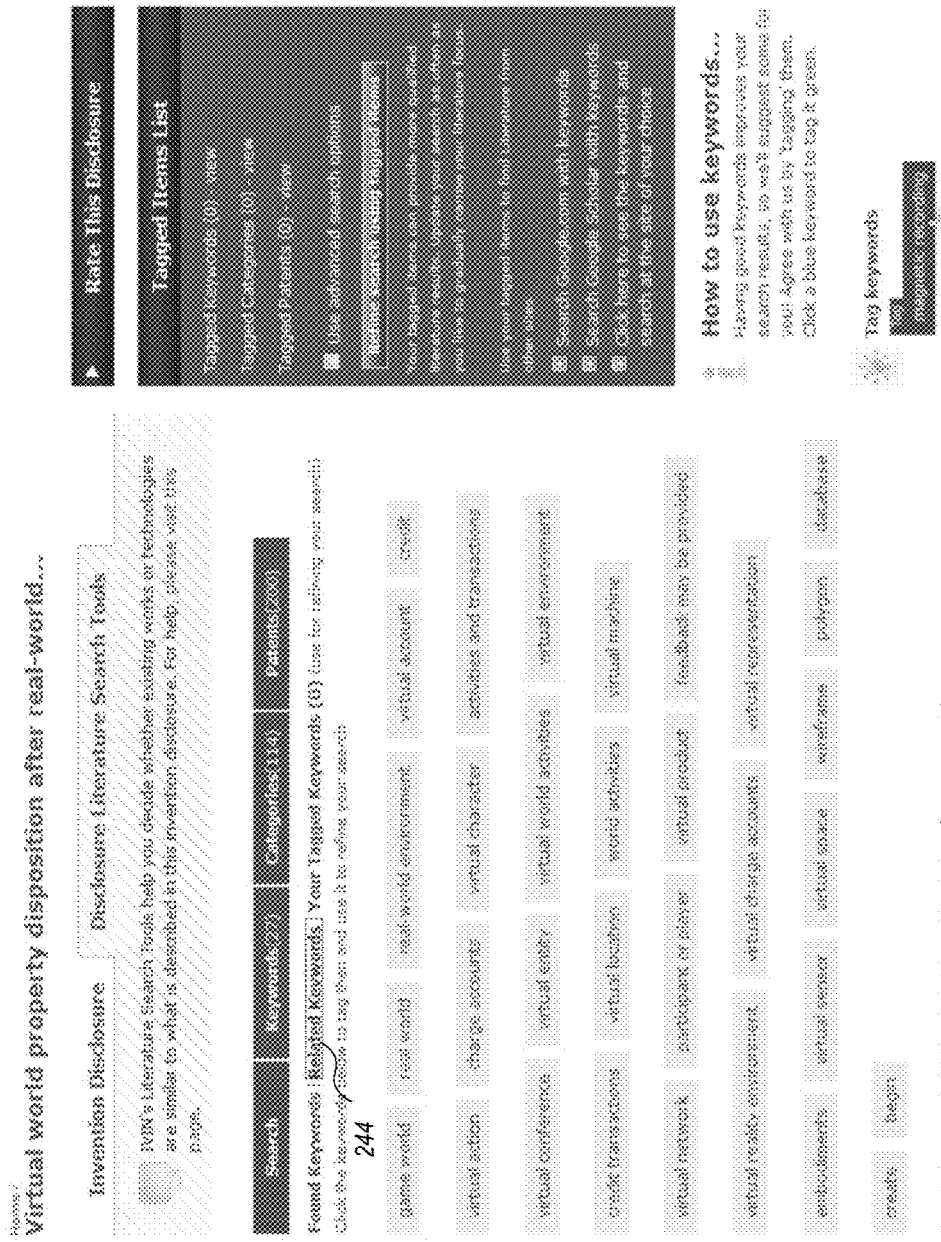
Figure 2H:
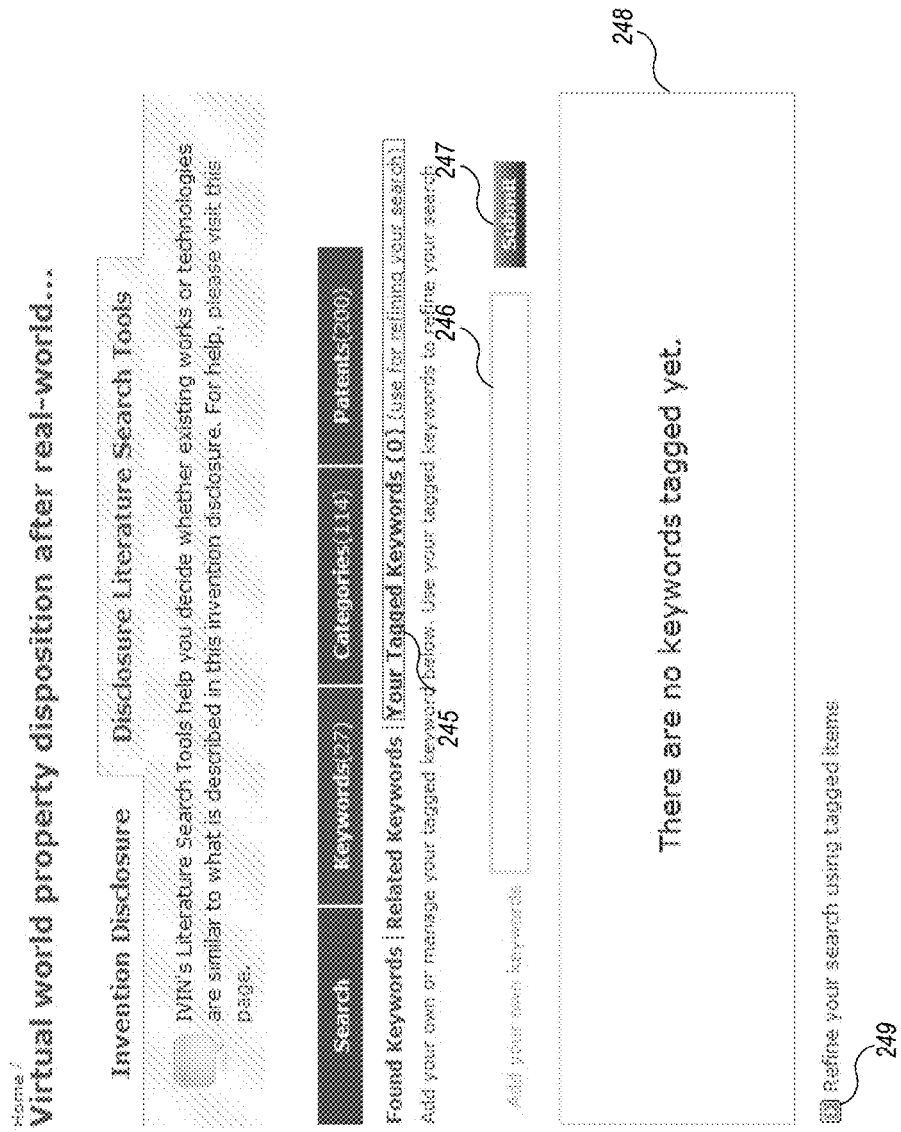
Figure 2I:
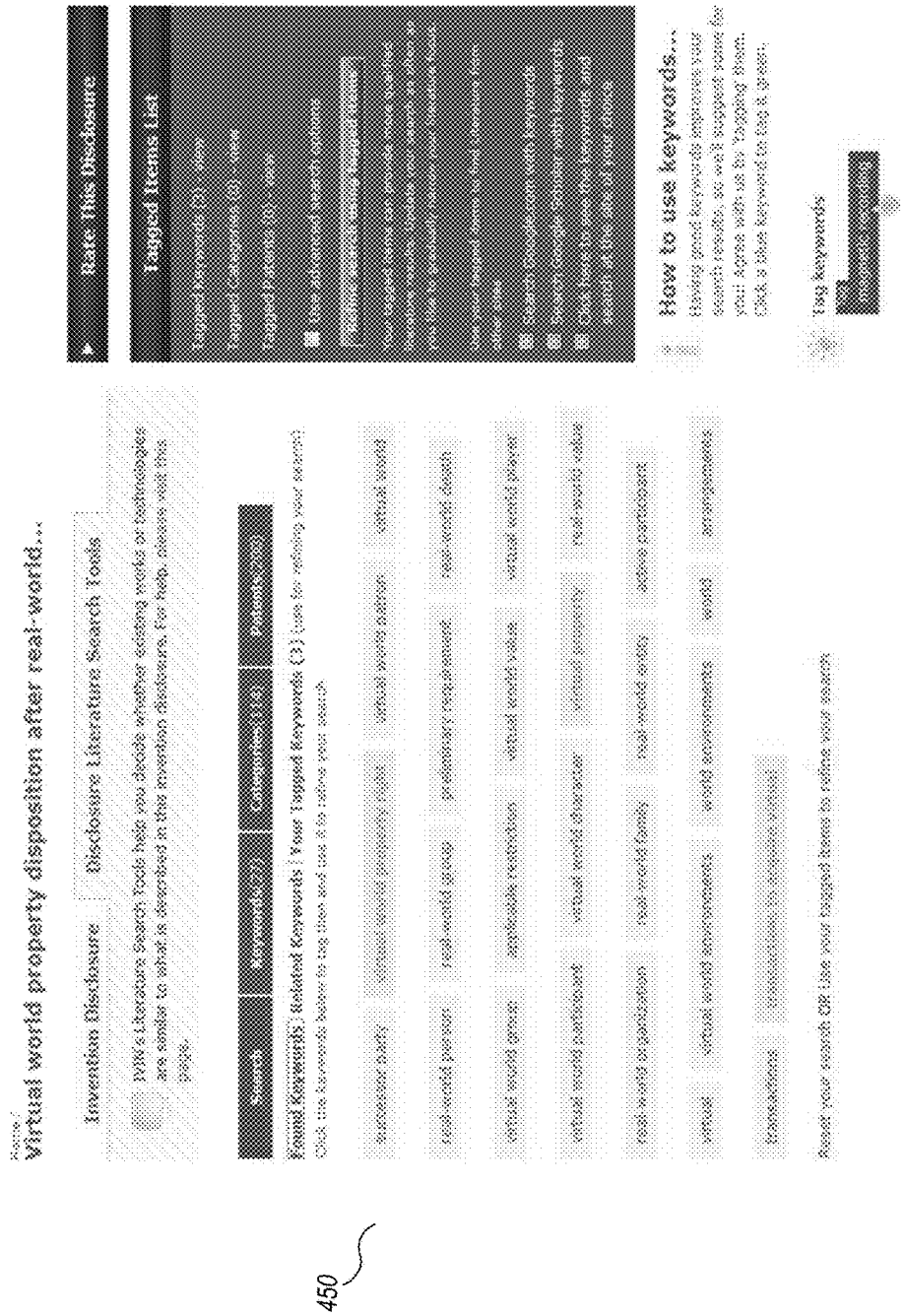
Figure 2J:
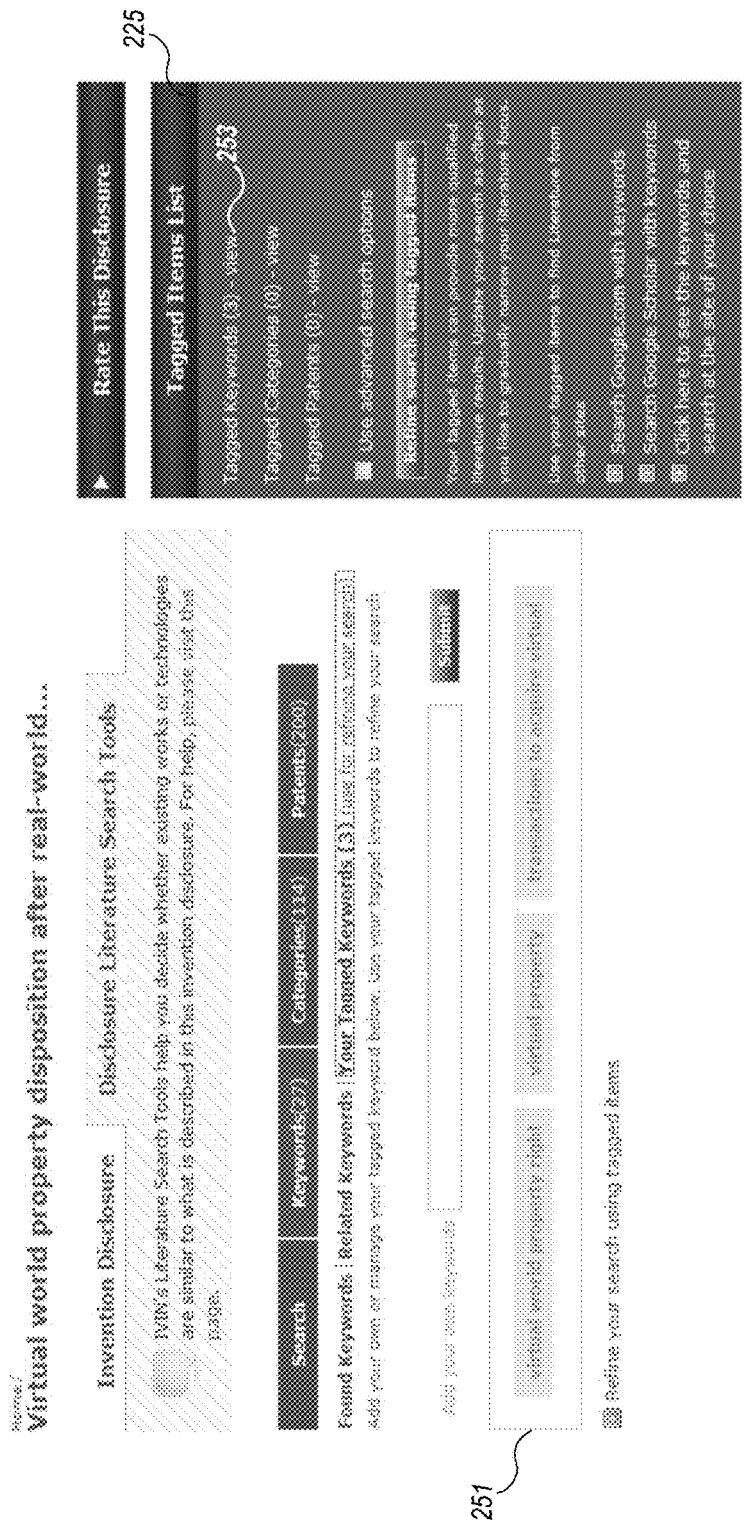
Figure 2K:
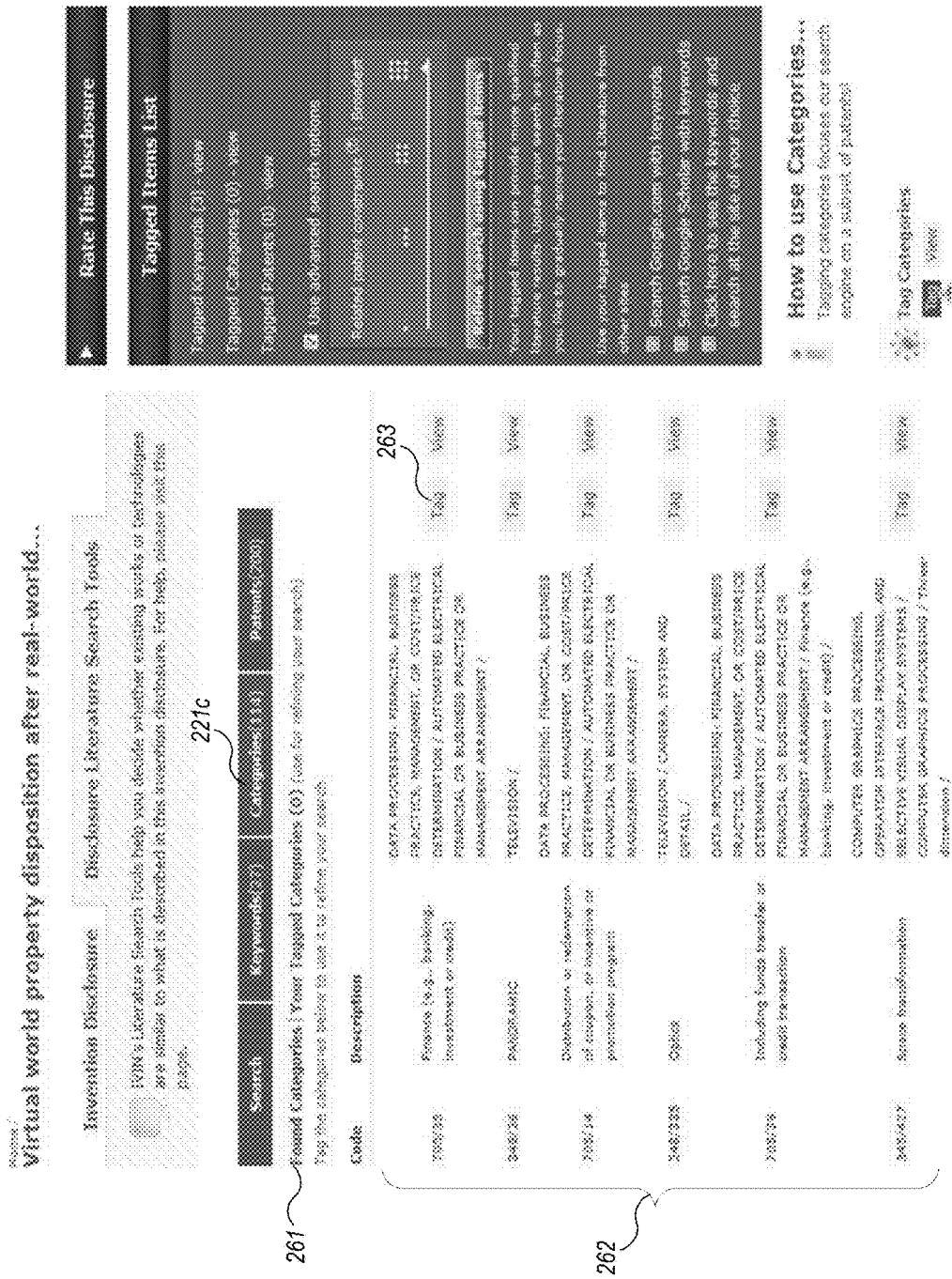
Figure 2M:
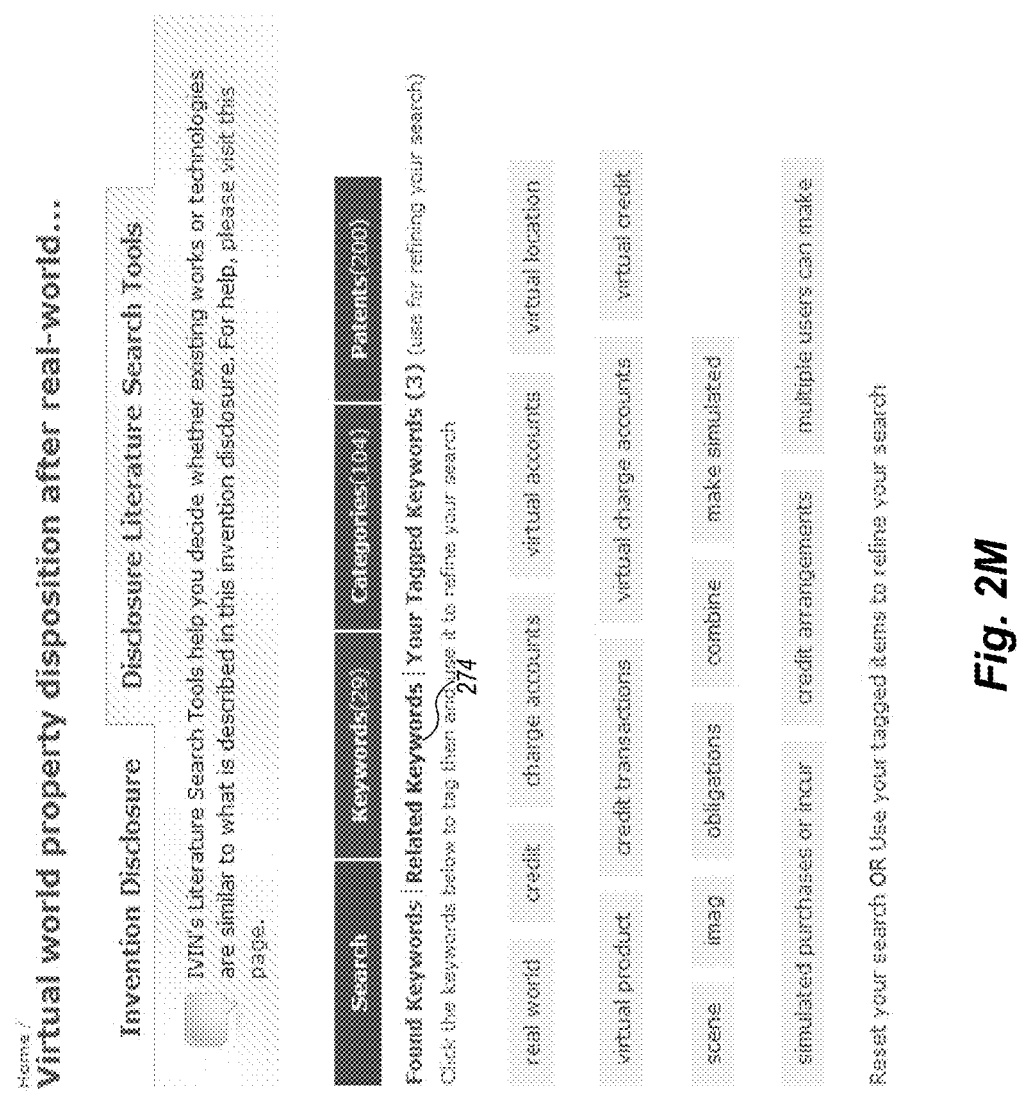
Figure 2N:
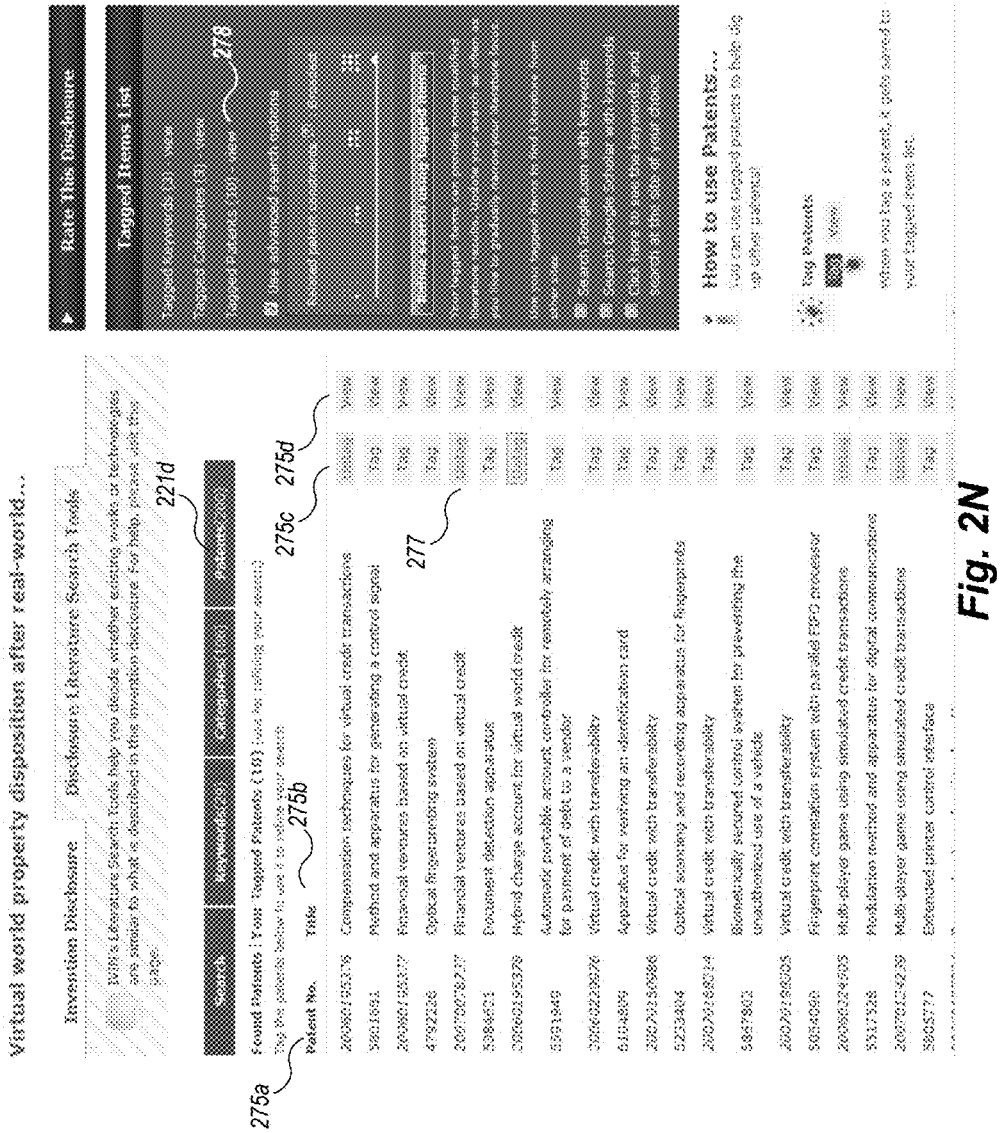
Figure 2O:
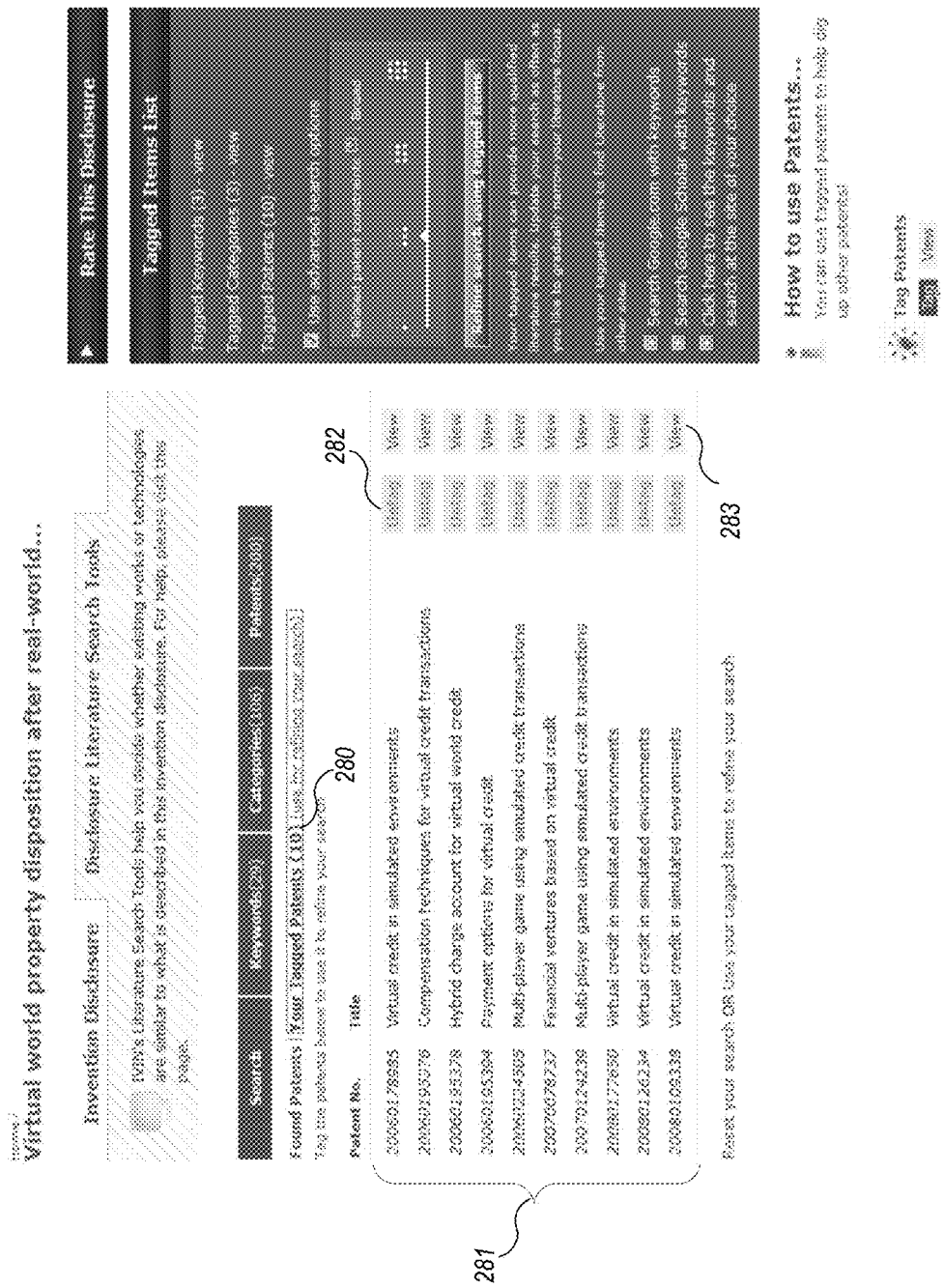
Figure 2R:
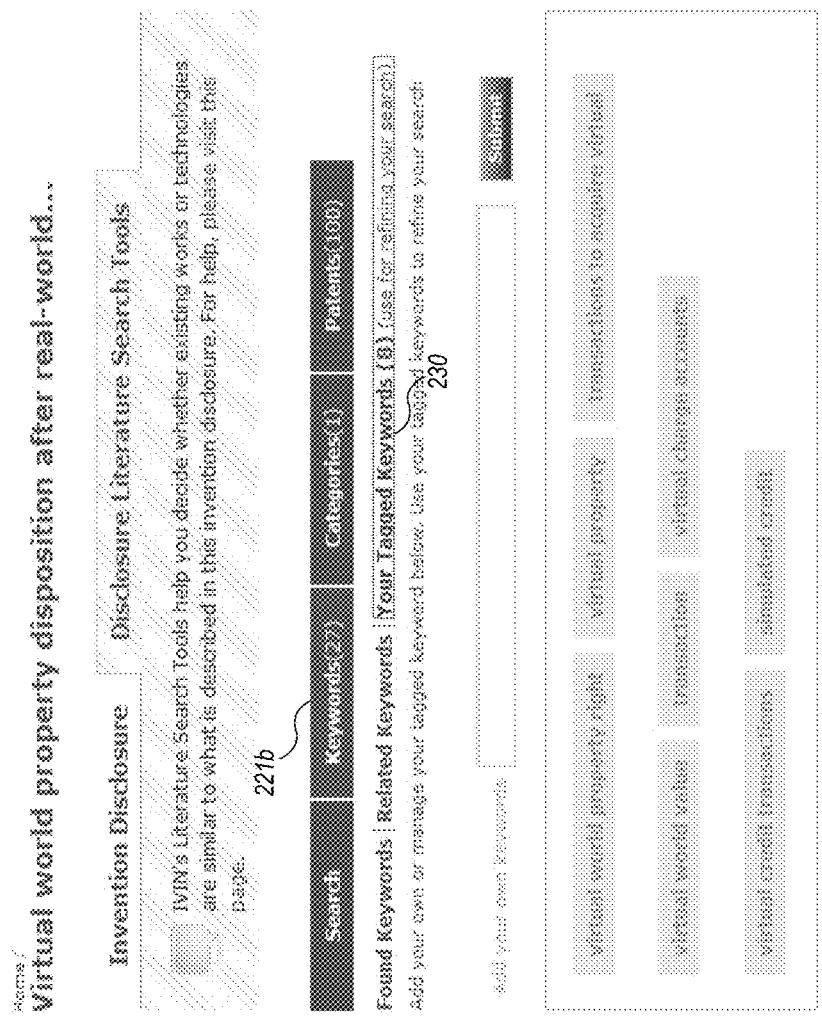
Figure 2U:
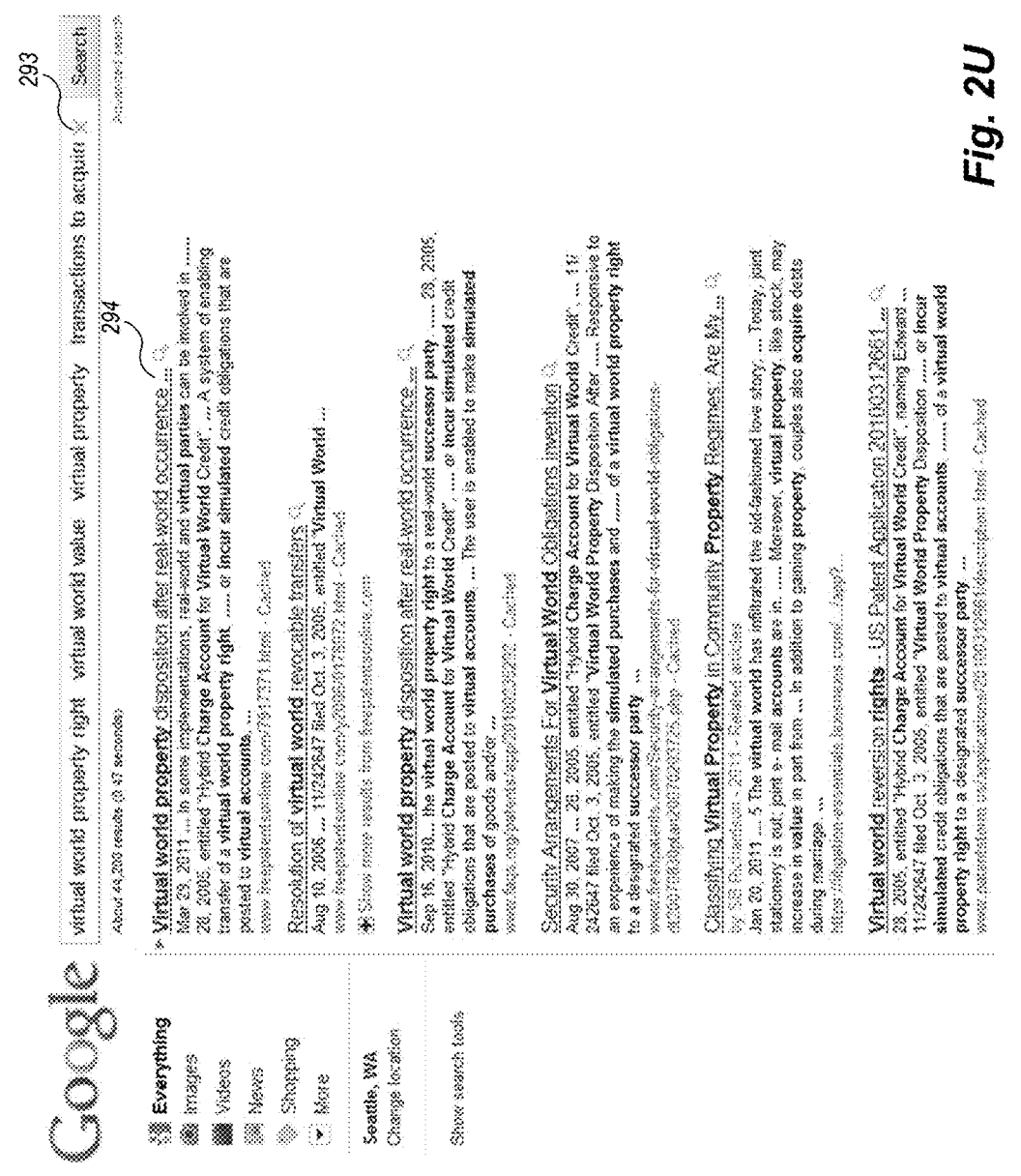
Figure 2V:
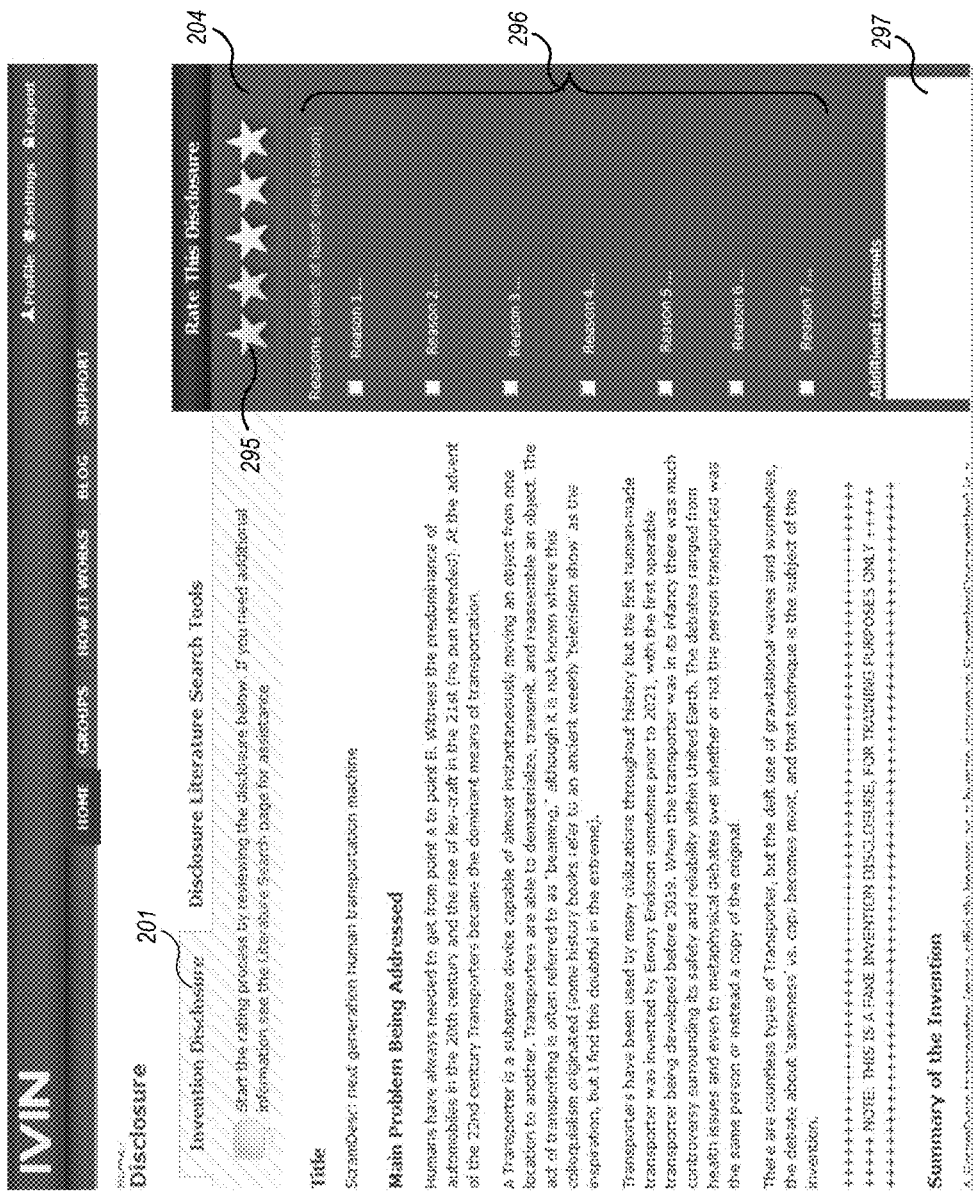

FIGS. 2A-2V are example screen displays from an example IP Invention Management System and Patent Related Publication Search Engine user interface for locating patent related literature using iterative searching and citation analysis. In FIG. 2A, the IVIN tool 200 provides an interface for presenting invention disclosures 201 as one example of input text and an interface for running disclosure search tools 202. The example input text shown under invention disclosure tab 201 illustrates portions of input text using an example invention disclosure to be turned eventually into a patent application if the invention is determined to be potentially patentable, with respect to prior art (e.g. references that render the disclosure not novel, obvious, lacking inventive step, etc. that predate the disclosure under the applicable patent laws and rules). The illustrated text 203 comprises a title, a description of the problem being addressed, and a summary of the invention in the form of claims. The IVIN 200 interface includes a rating area 204, a navigation control with hyperlinks 205 for navigating to the portions of the disclosure, and help. Link 207 indicates an example "RFI" (request for invention) document, in a scenario where the disclosure information is being used as background for a request for further invention. In such a scenario, the user can use the disclosure 203 as background to find patent related publications to determine if and how it is possible to address the RFI.

FIGS. 2B and 2C illustrate an example, albeit imaginary, RFI 210. Using the IPIMS 100 user interface (IVIN) 200, the user can choose to submit specific portions of the RFI 210 to conduct specific searches for patent related publications relating to the specific portions of the RFI 210. As illustrated, IVIN 200 provides an RFI navigation control 211 for navigating to specific portions of the RFI.

FIG. 2D illustrates an example interface for running the disclosure search tools (PRPSE 102). In response to selection of the search tools tab 220, IVIN 200 displays an initial interface that incorporates the text of the underlying invention disclosure (or other input text), such as that shown in FIG. 2A. Specifically, the search tool interface provides four distinct areas of input 221, which, in some example IPIMS interfaces, are also areas of output. This allows the results from a previous search to be iteratively used for subsequent invocations of the PRPSE. Specifically, search tab 221a is primarily for viewing and providing input to the PRPSE; keyword tab 221b is for viewing and tagging keywords; tab 221c is for managing categories such as USPTO classifications, which can be used to adjust the input in the example PRPSE illustrated or to filter the resulting patent related publications, when using other example PRPSEs; and tab 221d is for viewing and tagging patent related publications. In other example interfaces other capabilities may be available and/or the illustrated capabilities operated in other organizations and in other fashions. Before indicating to IPIMS 100 to begin the search process, the user views possible disclosure text in viewing area 222 and can indicate via interface control 223 whether or not to include all of the disclosure text. In some examples (not shown), controls are provided to easily indicate a desire to include one or more of a title, claims, an abstract, another portion of text, or the full disclosure (or other fields). Tagged item list 225 provides a quick navigation mechanism to view the tagged (or otherwise inputted) keywords, categories and/or patent related publications. When the user is ready to run another invocation of the search tool (PRPSE 102), the user selects user interface control 226, which the first time does a few different things than upon subsequent invocations, as described below with reference to FIGS. 8-10. Control 228 is available to refine the search upon subsequent invocations of the PRPSE on the selected input. To reset the search, the user selects reset control 227.

FIG. 2E is an example tagged item list 225 as provided by an example IPIMS interface. Tagged keyword control 230 provides a quick link to view keywords tagged so far (which can be viewed under the keywords tab 221b). Tagged category control 231 provides a quick link to view the categories tagged so far (which can be viewed under the categories tab 221c). Tagged patents control 232 provides a quick link to view the patent related publications tagged so far (which can be viewed under the patents tab 221d). As mentioned, the "refine search" control 228 initiates another invocation of the PRPSE using the tagged items.

FIG. 2E also illustrates an advanced search option available in some example IPIMS user interfaces. Advance search control 235 offers the user the availability to constrain how narrow or broad the system should be in determining patent related publications using citation analysis. For example, in one example PRPSE, the results determined by citation analysis may be constrained to locate as correlated only patent related publications that share the same primary classification (the same primary class as the source publication used to locate the cited publications), that share the source publication's primary classification but as any listed classification (e.g., a secondary classification), or that both share a classification in common. Other constraints can be similarly incorporated including ones not based upon categorization, taxonomies, or classifications. Also, in the example PRPSE 102 described the constraints are applied automatically before the user sees results. In other example PRPSEs, the constraints may be toggled as filters after the user can view the results.

FIG. 2F illustrates an example user interface screen display after the user begins a PRPSE search using control 226 and the input provided and shown in FIG. 2D. Specifically, in this example, the user has submitted the entire disclosure text as input text to the PRPSE 102. The example IPIMS 100 indicates that the PRPSE 102 is busy computing the search results by changing the display of the interface tabs as busy keyword tab 241, busy category tab 242, and busy patent tab 243. A set of keywords that are found in the inputted text (found keywords 240) are presented to the user. From these, the user can tag keywords or submit additional keywords to use in refining the search.

As described above, in some example environments, the PRPSE 102 uses semantic analysis and other tools to determine the TF/IDF (term frequency, inverse document frequency) of keywords (words and phrases) to semantically analyze the text (including, for example, parsing, determining parts-of-speech and/or grammatical usage) to extract predominant keywords from the input text. In other tools, simply term frequency is computed and the most frequent terms (words and phrases) are provided to the user as "Found Keywords" 240. In yet other examples, the proximity of found keywords are taken into account and the most frequent and/or proximate words/phrases are displayed to the user. In some example PRPSEs 102, a limit of the number of keywords is imposed to improve the efficiency of the system.

After the PRPSE 102 has finished a round of computing search results, the additional, new, or modified results are displayed under the IPIMS 200 interface tabs 221. A display available via the related keywords control 244 displays keywords that are related to the found keywords. These are additional keywords extracted from patent related publications determined by performing a full text search of the corpus (e.g., corpus 103) for patent related publications that include the found keywords (an initial set of patent related publications) or determined from keywords found from patents found using citation analysis of these patent related publications. Thus, these keywords may be "suggested" keywords that the user can additionally consider and tag for subsequent search refinement. In one example PRPSE they are determined using a TF/IDF analysis (and/or proximity analysis, etc.) of the initial set of patent related publications determined by performing a full text search of the corpus. The user can also input keywords directly in input field 246 and submit them to the PRPSE using submit control 247, as shown in FIG. 2H. Again, as described, once items are tagged or input, the user can select the refine search control 249 to cause the PRPSE to iteratively produce another set of search results.

FIG. 2I is an example screen display of the IPIMS 100 interface after the user has selected one or more keywords

450. Three keywords have been selected, which are shown in FIG. 2J as "tagged keywords." Tagged item list 225 now shows a modified tagged keyword control 253, which can be selected at other point in the interface to get back to the display screen shown in FIG. 2J.

FIG. 2K is an example screen display illustrating categories extracted from determine patent related publications. In an example PRPSE 102, the categories are extracted from the initial set of patent related publications determined by performing a full text search of the corpus (e.g., corpus 103) for patent related publications that include tagged (and optionally some number of found and/or related) keywords. In some examples, the number of keywords is limited, in others it is unlimited. In other example PRPSEs 102, the categories are extracted as well from patent related publications which are determined using citation analysis, as will be described further below.

The found categories control 261 may be selected to display the category information for each of the categories determined. In some examples, the category information is derived from the classification information available from the USPTO classification manual. In other examples, the category information is based upon external or third party taxonomy information. As shown, a user may tag any presented category, for example using tag control 263.

The purpose or use of tagged categories may vary with the PRPSE used. In one example PRPSE 102, a more intricate user interface is presented to allow the user to indicate one or more categories to include and one or more categories to exclude such as for use in filtering returned patent related publications. In some examples, the categories may be collapsed and expanded by level.

Figure 3:
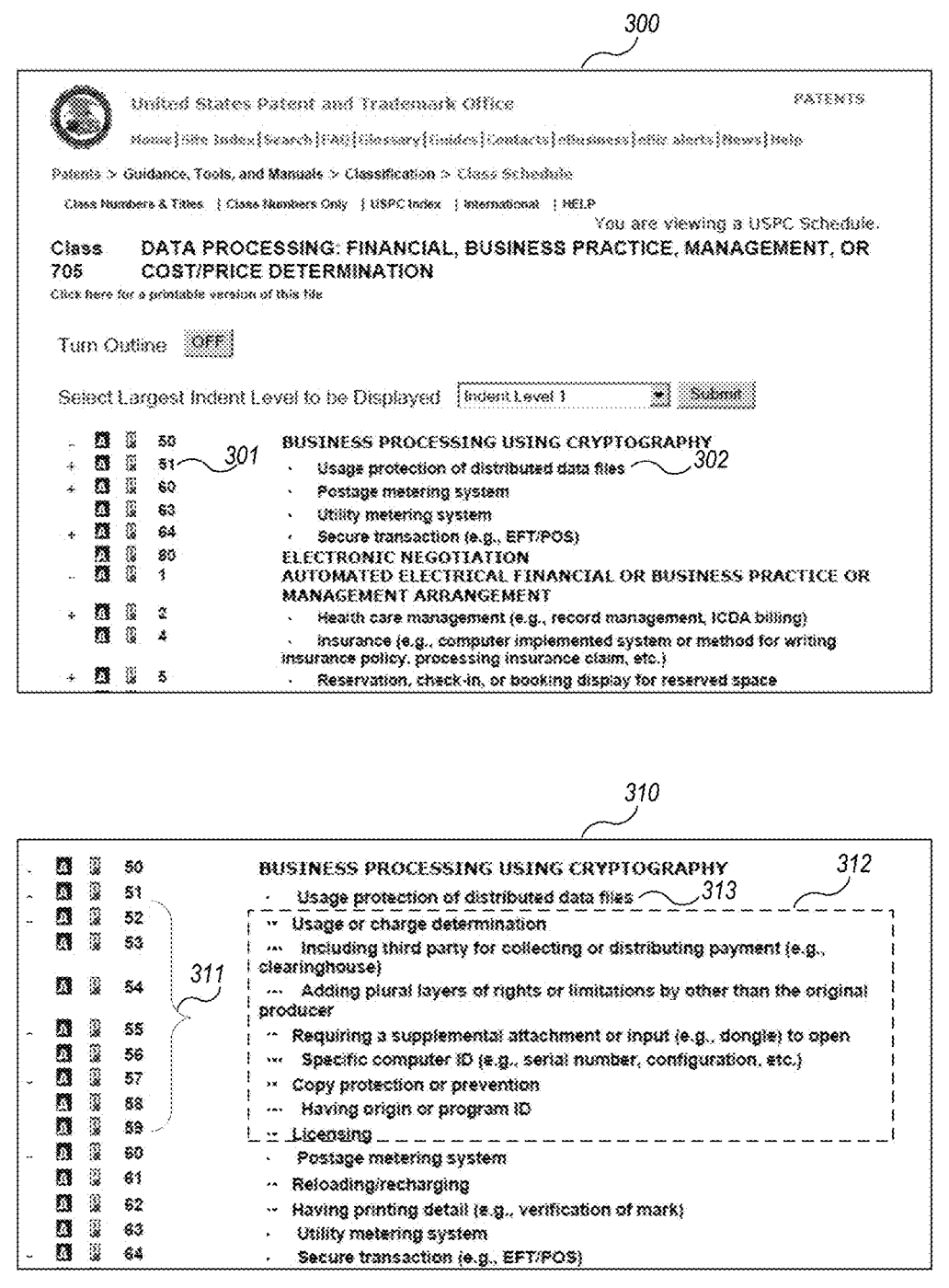

For example, the USPTO patent classification system maintains several levels of sub-classifications for each primary class. Deeper levels can be collapsed to a high subclass to include less granular categorization. FIG. 3 is an example screen display of an excerpt from the United States Patent and Trademark Office classification taxonomy that is used by an example Patent Related Publication Search Engine. Displays 300 and 310 are from an online interface to the patent classification manual. In display 300, sub-classification 51 is shown as a second level subclass of class/subclass 705/50 (Business Processing Using Cryptography within the Data Processing: Financial, Business Practice, Management, or Cost/Price Determination). Display 310 illustrates several additional subclass levels 311 within subclass 51 having description 313 (namely subclasses 52-59 having descriptions 312). When these subclasses are "rolled-up" (e.g., collapsed), they are all part of (i.e., grouped under) subclass 51 301 with description 302. Such an interface may be incorporated to provide a user with an ability to designate (e.g., tag, select, input, determine, or the like) particular categories.

In other example PRPSEs 102, the tagged categories are used to automatically extend or expand what is effectively the user's tagged patent related publications to include all of the patent related publications in all tagged categories. This has the effect of potentially broadening the search. For example, by tagging the categories using tagging controls 264, 265, and 266 displayed in FIG. 2L, the user will include the corresponding patent related publications in the PRPSE search upon the next invoked refinement of the search.

FIG. 2M is an example screen display of related keywords after the user has invoked the example PRPSE 102 with the three keywords and three categories tagged as shown in previous figures. As can be observed comparing FIG. 2M to FIG. 2G, the related keywords now appear to be more relevant to the focus of the inventions disclosure (i.e., virtual world property disposition after real-world occurrence—the transfer of virtual world property).

FIG. 2N is an example screen display of the determined patent related publications after the PRPSE 102 has finished a round of computing search results. The patents table 221*d* shows a listing of determined patent related publications. In some PRPSEs 102, the listing is a maximum number of publications (here, 200) to improve search efficiency. In other examples, the number may vary or be unlimited. Each publication in the list is displayed by its patent number (or publication number) 275*a*, title 275*b*, a tag control 275*c* for indicating the publication in subsequent search (refinement) iterations, and a link 275*d* to view (e.g., accessing, printing, etc.) the underlining publication, wherever it is located (e.g., in corpus data repository 103). In some examples, the list is sorted and/or ranked according to which publications more readily match the inputted text and/or tagged keywords, publications, etc. In other examples, the list is not sorted. As will be described with respect to FIGS. 9 and 10, (using the PRPSE 102 for refined searches) the publications may be a result of a full text search of the corpus for an initial set of patent related publications that include the submitted keywords (e.g., tagged and potentially some number of other keywords) in combination with a search for patent related publications that are correlated to those in the initial set based upon a citation analysis. Other aggregations and techniques for determining a set of patent related publications may be similarly incorporated.

In the example shown, the user has tagged ten patent related publications from a previous search iteration. FIG. 2O shows the ten publications 281 tagged by the user. The tagged patent control 280 may be used to navigate the user interface to display a list of the publications that have been tagged. These tagged publications may be used by an example PRPSE 102 in addition to those from the full text search to derive the correlated patent related publications. By tagging publications in this way, the search iterations are more likely to produce related results upon refinement searches. The user may select an untag control, e.g., controls 282 or 283, to remove selection of the publication from search input.

A display available via the related keywords control 244 displays keywords that are related to the found keywords. These are additional keywords extracted, for example, from patent related publications determined by performing a full text search of the corpus (e.g., corpus 103) for patent related publications that include the found keywords (an initial set of patent related publications) or using other methods.

FIG. 2P is an example screen display of rerunning the search tool with the ten previously tagged patents, the three tagged keywords, and the three tagged categories. As shown, only one category is now display as applicable under the found category control 284, even though three categories are still tagged. This is due to incorporating some advanced search options in this iteration. The search results are now narrowing based upon the user's prior selections. FIG. 2Q shows the corresponding patent related publications resulting from the same iteration of the search tool. The patents shown under the found patents control 287 are now beginning to appear very related.

At this point, additional keywords may be identified to help narrow the search. FIG. 2R shows the keywords tab 221*b* of the IPIMS 100 interface after the user has selected five additional keywords to make the search more transaction focuses. The tagged keywords are displayed using tagged keyword control 230.

FIG. 2S illustrates the resultant patent related publications after the search has been refined using the eight tagged keywords. The found patents control 287 may be used to navigate to the 100 determined patent related publications. After scrolling down the presented list, as displayed in FIG. 2T, it may be discovered that there are three existing publications 292 that have exactly the same title as the inputted disclosure. The user may then view the underlying publications and determine whether any part of the invention disclosure is now patentable.

In some example IPIMS 100 interfaces, a user may use the tagged and/or found keywords (or some number of them) to perform a federated search using third party tools. In FIG. 2F, link 235 may be selected to forward keywords to an external search tool (such as "Google.com", Google Scholar, or a user selectable site) to obtain search results using a different search tool. Using a federated search can be helpful both to search non-patent literature or to simply hone in on patent related publications using different tools. FIG. 2U illustrates the result of selection of the "Google" search tool using link 235 with previously tagged eight keywords in input text field 293. The first found item in the resultant list 294 is one of the patent application publications shown in FIGS. 2S and 2T.

Once the user has finished any number of searches, as described with respect to FIG. 2A, the user can rate (e.g., score, distinguish, comment on, etc.) the disclosure, asset, or the like, depending upon the context in which the IPIMS 100 is being used. FIG. 2V is an example screen display of one such interface for rating patent invention disclosures. In the rating area 204, the user may select a rating range, here illustrated as 1-5 stars 295. In an example IPIMS 100, a selectable list of reasons 296 can be indicated as well as (freeform or structured) comments in comment field 297. Other rating interfaces may be similarly incorporated.

In one example IPIMS 100, disclosures are rated by reviewers to determine whether the business entity supporting the IPIMS 100 should put any further resources into their development. Disclosures may be scored using various categories on a 1- through 5-star scale, where a score of 1 star indicates an invention that is not valuable and a score of 5 stars indicates an invention which has the highest potential value.

Figure 4A:
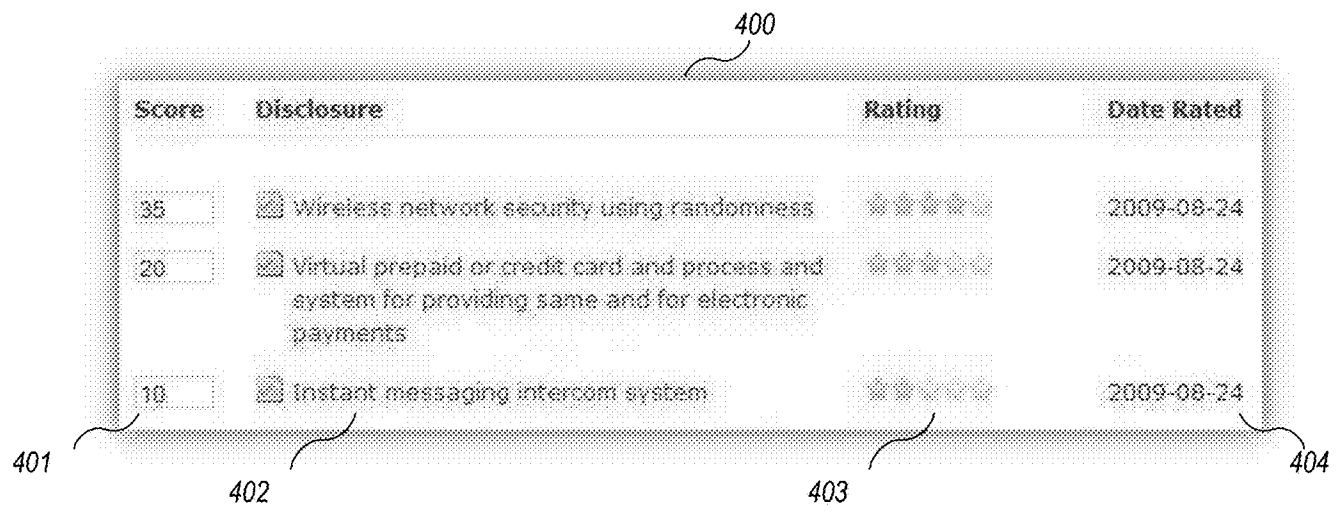

In some example rating systems, different categories (including simply the literature discovered using the PRPSE) may be used to derive the rating. In some example IPIMS environments, several disclosures may be rated together to assess some measure of relative importance. FIG. 4A is an example screen display of an example user interface for scoring asset disclosures as a group. In FIG. 4A, a score 401 portion of 100 points is allocated to each disclosure 402, previously individually rated, as shown by rating 403 and the date rated 404. This allows an additional level of relatively weighting a rating of a disclosure (or similar input being rated or scored).

In addition, in some example IPIMS environments, reviewers may be ranked and or rewarded (even with monetary remuneration) based upon their abilities to find literature, rank disclosures, or the like assessed against known calibration data, for example, a series of disclosures selected by the entity operating the IPIMS with known results. In addition, in some examples, user reviewers may be ranked over time or categorized as experts based upon their frequency of participation in certain categories of patent related publications. Other variations are contemplated.

For example, in some example IPIMS environments, search snapshot histories can be shared, maintained, used as a basis for group and/or individual workflows, and the like, to capitalize on the different viewpoints, expertise, and experience that different individuals bring to solving a problem. Example IPIMS environments may support search snapshot histories, which enable (e.g., an authorized) user to view and potential restore the state of a PRPSE for a designated search at some designated point in time. Search snapshots can be persisted to a data repository, accessed, shared, used as a basis for a new or modified search, commented upon, used to assess or compare individual or group progress, for example as a basis for distributing incentive rewards, and the like.

Figure 4B:
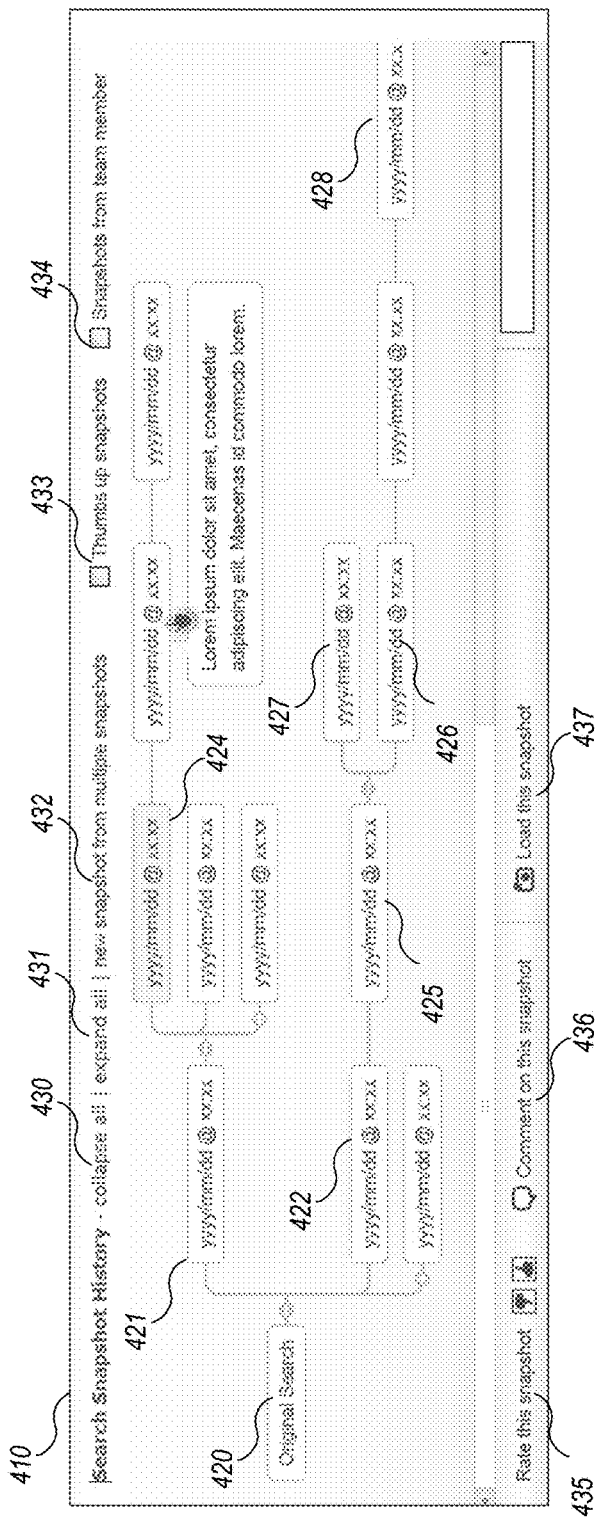
FIGS. 4B-4C are example screen displays of an example user interface for managing and interacting with search snapshots.

FIG. 4B is an example screen display of an example user interface for manipulating and navigating search snapshots. A search snapshot history 410 comprises one or more search snapshot objects, represented here as nodes, for example nodes 420-428. Each node is a representation of a persistent search snapshot object stored in the IPIMS, for example, in search snapshot data repository 108 in FIG. 1. Each persistent object (not shown) stores sufficient data to be able to restore a search "session" or a particular search iteration for a user and/or to serve as a basis for a new search history "tree." In some example Search Snapshot Management Engines (e.g., SSME 107), each search snapshot object is part of a linked data structure that links a node to its prior search history and subsequent search history. For example, the persistent snapshot object corresponding to search snapshot node 422 may store a backwards reference to node 420 and a forward reference to node 425. In addition, example search snapshot objects may store information such as who performed (e.g., created) that particular search (and result), when, sufficient search result information to restore the iterative search result, for example, found, related, and tagged keywords, found and tagged categories, and found and tagged patent related publications. In example SSMEs, search snapshot objects may be accessed using an API and incorporated into interfaces, other than those illustrated here, and may be expressed using XML, thus exportable to other data structures and transferable.

Like other "tree-like" data structures, a search snapshot history may be manipulated and navigated using known traversal, sorting, etc. algorithms. In addition, standard single and multiple selection interfaces may be superimposed upon the search snapshot history 410 tree, as a navigation tool As illustrated, the search snapshot history tree may be collapsed using collapse control 430 or expanded using expand control 431. In addition, a user may mark (e.g., tag, select, or otherwise indicate) one or more search snapshot nodes and indicate that a new search snapshot is to be formed, for example, using control 432. Also, as the particular example interface shows, the search snapshot history may be filtered using a variety of factors, such as for example, by using control 434 to show only the snapshots from one or more team members, or by using control 433 to show only those snapshots that have been marked as helpful (with a thumbs up designation, or similar marking).

For example, the interface of the IPIMS may use search snapshot histories such as search snapshot history 410 to allow a user to navigate to a prior iteration or a subsequent iteration of a search by using the search snapshot "tree" control as a navigation toolbar. In addition, when a particular search snapshot object has been restored and then used in a subsequent different search iteration, the search snapshot history 410 may reflect this state by presenting a fork—a new search snapshot originating from the same (restored) search. For example, in the search snapshot history 410, search snapshot 425 has been used to derive two different search results 426 and 427. As another example, when the search iteration and result corresponding to node 428 is restored, the entire, potentially navigable tree starting with node 420 may be made available. Thus, if the user is unhappy with the search forked from node 428, the user may return to some prior search iteration represented by one or more of the nodes in the search snapshot history 410. In some example SSMEs the search snapshot histories, or one or more of the nodes, may be designated with particular access rights, such as viewable, restorable, shareable, and the like. Thus, search snapshot histories such as history 410 may be shared between users or within a designated group in order to obtain the benefit of collective wisdom.

Once a search snapshot, such as the search snapshot corresponding to node 424, is selected (e.g., marked, tagged, indicated, or the like), the snapshot can be acted upon. For example, depending upon the IPIMS interface, the corresponding search snapshot details, prior to restoration, may be viewed when the user "opens" the snapshot object, such as by performing the programmed "default" user interface action (e.g., double-clicking on the node representing the object using an input device such as a mouse). In addition, the selected search snapshot may be commented upon (e.g., using control 436) or rated (e.g., using control 435). Other actions (not shown) may be available in other user interfaces.

Figure 4C:
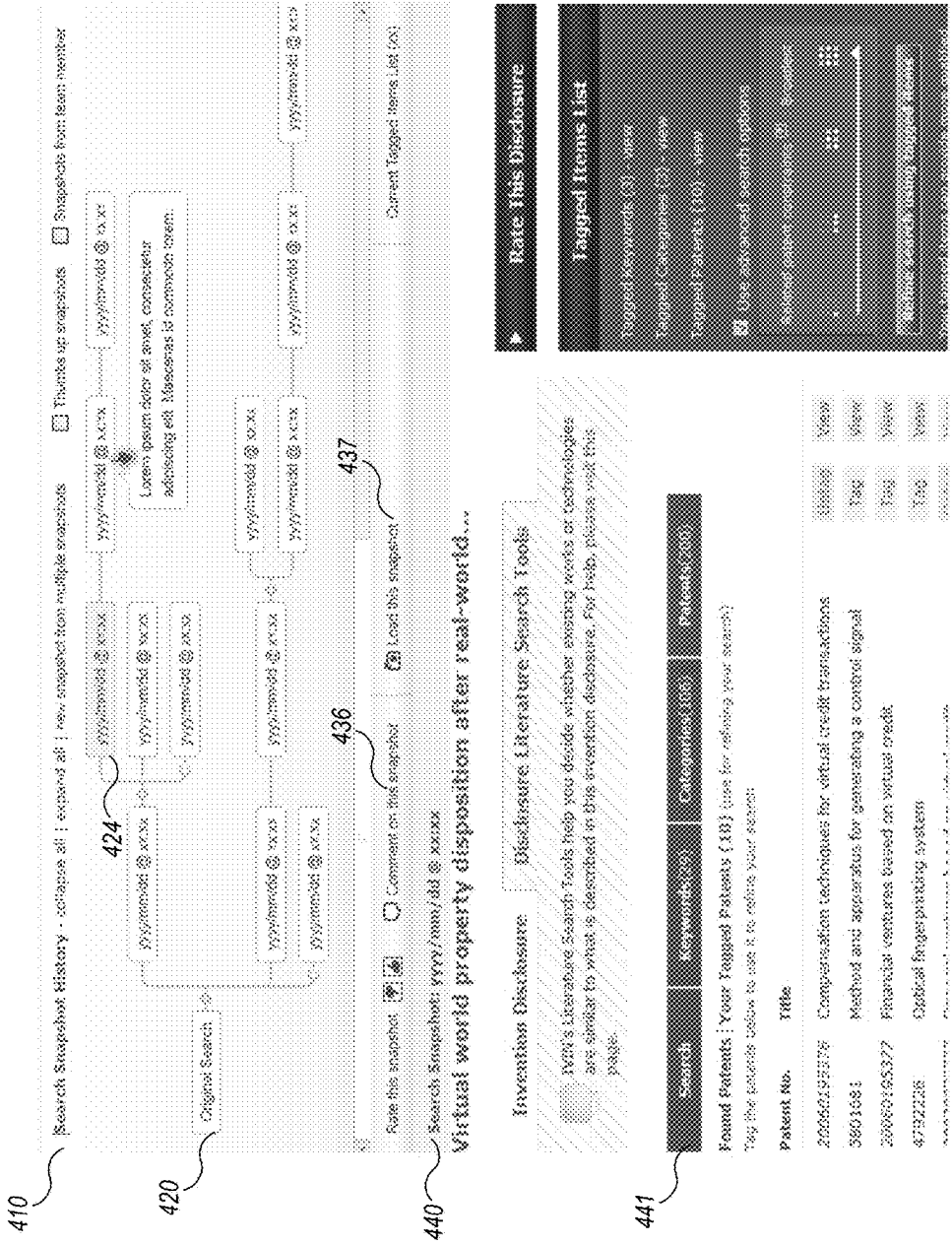

FIG. 4C is an example screen display of an example user interface for viewing a selected search snapshot. For example, FIG. 4C illustrates the results of a user selecting the search snapshot corresponding to node 424. The title and other identifying information 440 of the search snapshot is displayed, as well as the search results 441. The use of search snapshot objects, makes the ability to easily temporarily restore the search results for viewing, without losing the state of the search engine. In this way a user can "try" before restoring—to see if the search result might be a better effective way to continue a search.

Search snapshot histories and objects can be used in a variety of ways in addition to simply using them as navigation tools and transaction records which allow, for example, easy search session management, restoration, and the like. In one example, search snapshot histories can be used to bundle a set of results (favorable or otherwise) with its own explanation of how they were derived, to be sent to an expert for comment and/or help or to send to other interested parties, such as other reviewers or the inventor. This allows distribution of work load to different types of people—the more expensive researchers can be used in (e.g., saved for) different parts of the process. It also may cause reviewers to carefully assess their review ratings or effect their personal investments in an asset. It may also provide an opportunity for inventors to debunk references they consider irrelevant, optionally with comments in doing so. Also, inventors could include one or more such bundles with an invention disclosure so that reviewers of the disclosure can review and/or start with the inventor's leads. This allows an inventor to preemptively debunk any literature references which the inventor thinks are likely to crop up.

In another example, search snapshot histories can be used to organize a team project, where each member may find a unique path but be able to observe and/or use portions of others' search results. Adding information into a bundle tends to increase the size of its resulting search results rather than reduce it. Thus, in some example SSMEs it is possible to merge two or more bundles and see subsequent results which are more broad and varied than just the sum of the constituent parts. As a result if a searcher can view an all-up family tree of searches, the searcher could create arbitrary combinations of them (using multiple selection as described above) and thereby create a new family branch. Once the asset under review has passed a certain quality gate, such as an invention disclosure approved to move into patent drafting, an "official" bundle could be attached to the asset. Periodically this bundle may be run against an update search corpus as a means of surfacing newly relevant results. These bundles may also be used for submissions to a patent office, for example, to support Information Disclosure Statements.

As another example, if multiple snapshots are created by multiple people then example SSMEs can data-mine them as a way to determine which tagged things (e.g., keywords, categories, patent publications) occur the most frequently. An example SSME may use this information to construct a best-guess search string to use in a federated search, for example against other non-patent databases such as Google, Google Scholar, and more specific journal or publication databases. The SSME may surface common results from these alternate engines notifying interested parties when these results change significantly enough to warrant review, or at other times. These alternate results may also be used as new sources of extracted keywords.

In yet another example, search snapshot histories may be compared against one another to determine whether a particular searcher is effective and/or to rate the searcher, for example, against some calibrated search path. Also, they may be used as a metric to determine (e.g., judge) whether the searcher has expertise in a particular area. In addition, users may be rewarded based upon the information stored in search snapshot history objects. For example, bonuses or incentives or other types of attribution may be determined based upon search snapshot histories. For example, a particular bonus may be given to the searcher that finds the "knock out" publication. Yet, a prorated or lesser portion of the bonus may be designated (e.g., transferred, assigned, transacted, etc.) to those that contributed "up-line" in the transaction history. Contribution may be assessed based upon those that authored the searches relied upon by the searcher that ultimately found the publication, as recorded by the search snapshot objects.

Other uses may be similarly integrated.

Although the examples described herein often refer to a patent, patent application, or invention disclosure, many of the techniques described herein can also be used to search, classify, and rate other types of intellectual property assets, including trademarks, concepts, and generally anything that may be classified according to a taxonomy where at least some of the members contain forward and/or backward references to other members in the classifications. In addition, the concepts and techniques described may be used to classify input for other purposes such as to distribute it for review according to the expertise of potentially ranked reviewers, to review assets for potential purchase, investment, or enforcement, to search for literature to assist in further developing a concept, market, or product, or the like. Also, although certain terms are used primarily herein, other terms could be used interchangeably to yield equivalent examples. In addition, terms may have alternate spellings which may or may not be explicitly mentioned, and all such variations of terms are intended to be included.

Examples described herein provide applications, tools, data structures and other support to implement a PRPSE to be used for finding patent related publications and other literature. In the following description, numerous specific details are set forth, such as data formats and code sequences, etc., in order to provide a thorough understanding of the described techniques. The described examples also can be practiced without some of the specific details described herein, or with other specific details, such as changes with respect to the ordering of the code flow, different code flows, etc. Thus, the scope of the techniques and/or functions described is not limited by the particular order, selection, or decomposition of steps described with reference to any particular routine.

Figure 5:
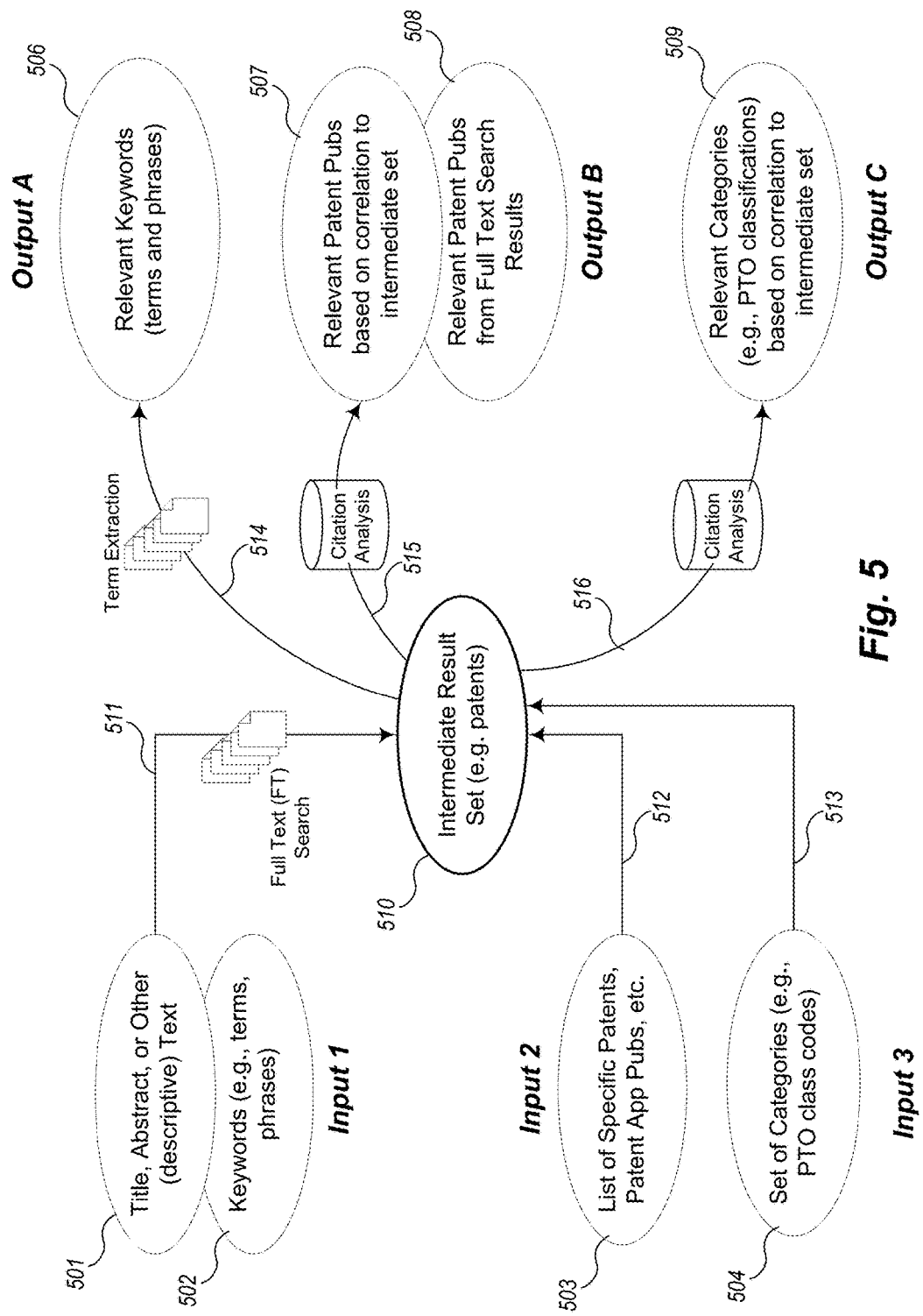
FIG. 5 is an example block diagram of an overview of data flow to and from the iterative Patent Related Publication Search Engine to generate lists of patent related publications and other output.

FIG. 5 is an example block diagram of an overview of data flow to and from the iterative Patent Related Publication Search Engine to generate lists of patent related publications and other output. As described above, the PRPSE is iteratively invoked to produce search refinements using one or more of: tagged keywords, tagged patent related publications, and/or tagged categories (or classifications). Each iteration is used to generate an intermediate result set 510, which is then used to generate revised (and additional) keyword, category, and publication output that can be used to generate a new intermediate result set 510 in a subsequent iteration. Other inputs and/or outputs can also be incorporated.

In particular, input text 501 (source text) such as a title, abstract, claims, or other descriptive text of an invention are used to generate keywords 502, which are matched against a corpus of patent related publications (such as corpus 103 in FIG. 1) to determine an initial set of publications that include at least some of keywords 502 found in input 501 or otherwise tagged for input (for example, by a user or provided by an application). In some example PRPSEs, these publications are determined using a full text search 511 or some modification thereof that finds the patent related publications that are "best related" to the keywords 502 and input 501. In some examples, best related may be determined by a straightforward pattern matching. In other examples, best related may be determined by semantic analysis, term frequency, proximity, and/or other considerations. Indicators to this initial set of publications are put in the intermediate result set 510. In addition, if a user or the system has specified a list of specific patents or patent publications 503 (such as those tagged using the interface illustrated in FIGS. 2A-V), then indicators 512 to these specific patent related publications 503 are placed in the intermediate result set 510. In addition, at least in one example PRSPE (that does not utilize categories as filters but rather to expand the universe of intermediate result set 510), if the user or system has specified a set of categories 504, then indicators 513 to the patent related publications corresponding to these categories 504 (e.g., all of the patent publications from the corpus that have these specified categories as their primary class codes) are placed in the intermediate result set 510.

Once the intermediate result set 510 is thus configured, the PRPSE may use citation analysis 515 to generate indications to relevant patent publications 507 that correlate to the indicated patent related publications in the intermediate set 510 and may combine the indicators to the correlated publications with indicators to the patent related publications indicated by the initial set of patent related publications 508 to form output B. Output B may be presented, for example, as a list of found patent publications such as patent publications list available on patents tab 221d in FIG. 2N. The PRPSE also may use citation analysis 516 to extract the categories of the correlated patent publications 507 to form output C. The categories of output C may be combined with the categories extracted from the intermediate result set 510, for example, those displayed on the found categories list 262 available on categories tab 221c in FIG. 2K, or may optionally be presented as additional "related categories" (not shown). In addition, supplemental keywords 506 may be extracted from the intermediate result set 510 to generate related keywords (e.g., suggested keywords) to form output A. Examples of these related keywords are illustrated in FIG. 2G and may be used to determine additional selected keywords, which may be made part of input 502 in a subsequent search. In any case, the user interface demonstrated in FIGS. 2A-2V illustrates some of the ways for presenting and manipulating inputs 1-3 and outputs A-C to yield refined search results. Other ways may be incorporated in other user interfaces that use the techniques of a PRPSE described herein to perform patent related searches.

Figure 6:
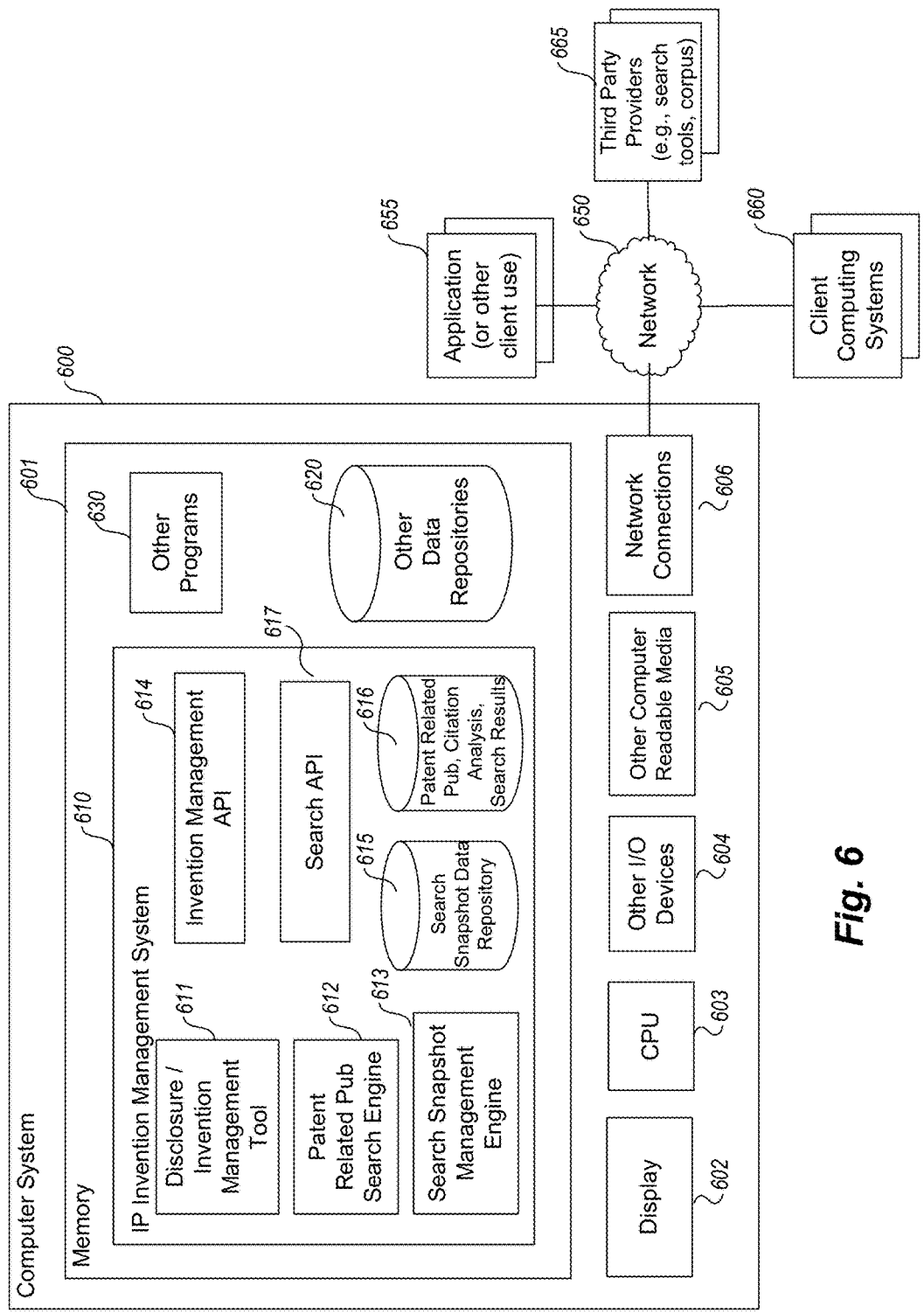
FIG. 6 is an example block diagram of a computing system for practicing examples of a Patent Related Publication Search Engine.

FIG. 6 is an example block diagram of a computing system for practicing examples of an IP Invention Management System and a Patent Related Publication Search Engine as described herein. Note that a general purpose or a special purpose computing system suitably instructed may be used to implement an IPIMS and a PRPSE. Further, they may be implemented in software, hardware, firmware, or in some combination to achieve the capabilities described herein.

The computing system 600 may comprise one or more server and/or client computing systems and may span distributed locations. In addition, each block shown may represent one or more such blocks as appropriate to a specific example or may be combined with other blocks. Moreover, the various blocks of the IPIMS 610 may physically reside on one or more machines, which use standard (e.g., TCP/IP) or proprietary interprocess communication mechanisms to communicate with each other.

In the example shown, computer system 600 comprises a computer memory ("memory") 601, a display 602, one or more Central Processing Units ("CPU") 603, Input/Output devices 604 (e.g., keyboard, mouse, CRT or LCD display, etc.), and other computer-readable media 605, and one or more network connections 606. The IPIMS 610 is shown residing in memory 601. In other examples, some portion of the contents, some of, or all of the components of the IPIMS 610 may be stored on and/or transmitted over the other computer-readable media 605. The components of the IPIMS 610, including the PRPSE 612, preferably execute on one or more CPUs 603 and manage the invention disclosures including searching for patent related publications, as described herein. Other code or programs 630 and potentially other data repositories, such as data repository 620, also reside in the memory 601, and preferably execute on one or more CPUs 603. Of note, one or more of the components in FIG. 6 may not be present in any specific implementation. For example, some examples embedded in other software may not provide means for user input or display.

In a typical environment, the IPIMS 610 includes one or more disclosure/invention management tools 611, one or more patent related publication search engines 612 (PRPSE), and one or more search snapshot management engines 613. Also, the IPIMS 610 includes one or more search snapshot data repositories 615 and one or more data repositories 616 storing patent related publications, citation analysis tables, and search results. In at least some examples, the PRPSE 612 is provided external to the IPIMS 610 and is available, potentially, over one or more networks 650.

The disclosure invention management tool 611 is responsible for managing disclosures and other invention related documents, including implementing a view and controller for interacting with the IPIMS 610.

The patent related publication search engine 612 is the iterative search tool described herein and may be invoked by the IPIMS 610 to be used in the process of managing, distributing, and/or rating disclosures, or may be invoked through the search API 617 to be used for other purposes such as in another environment. In addition, the PRPSE 612 may be implemented as a service (software as a service) and invoked in a variety of circumstances.

The search snapshot management engine (SSME) 613 is used to maintain search snapshot history objects, especially (but not necessarily) in conjunction with the PRPSE 612. Such objects may be made persistent and may be stored in the search snapshot data repository 615. Search snapshot objects may be saved, restored, forked, merged, and the like, and may in some examples be accessed via a search snapshot API (not shown).

Other and/or different modules may be implemented. In addition, the IPIMS 610 and/or the PRPSE 612 may interact via a network 650 with application or client code 655 that utilizes the search API 617 to access the PRPSE 612, one or more client computing systems 660 that provide a client side interface to the IPIMS 610 and to the PRPSE 612, and/or one or more third-party information provider systems 665, such as purveyors of information used in patent related publication, citation analysis portions of data repository 616. Also, of note, the patent related publications and citation analysis portions of data repository 616 may be provided external to the PRPSE 612 and IPIMS 610 as well, for example in one or more knowledge bases accessible over one or more networks 650. In addition, the search results portion of data repository 616 may be separate (indeed if the other data is provided by third parties) and may also be stored remotely, potentially accessible over the network 650.

Figure 7:
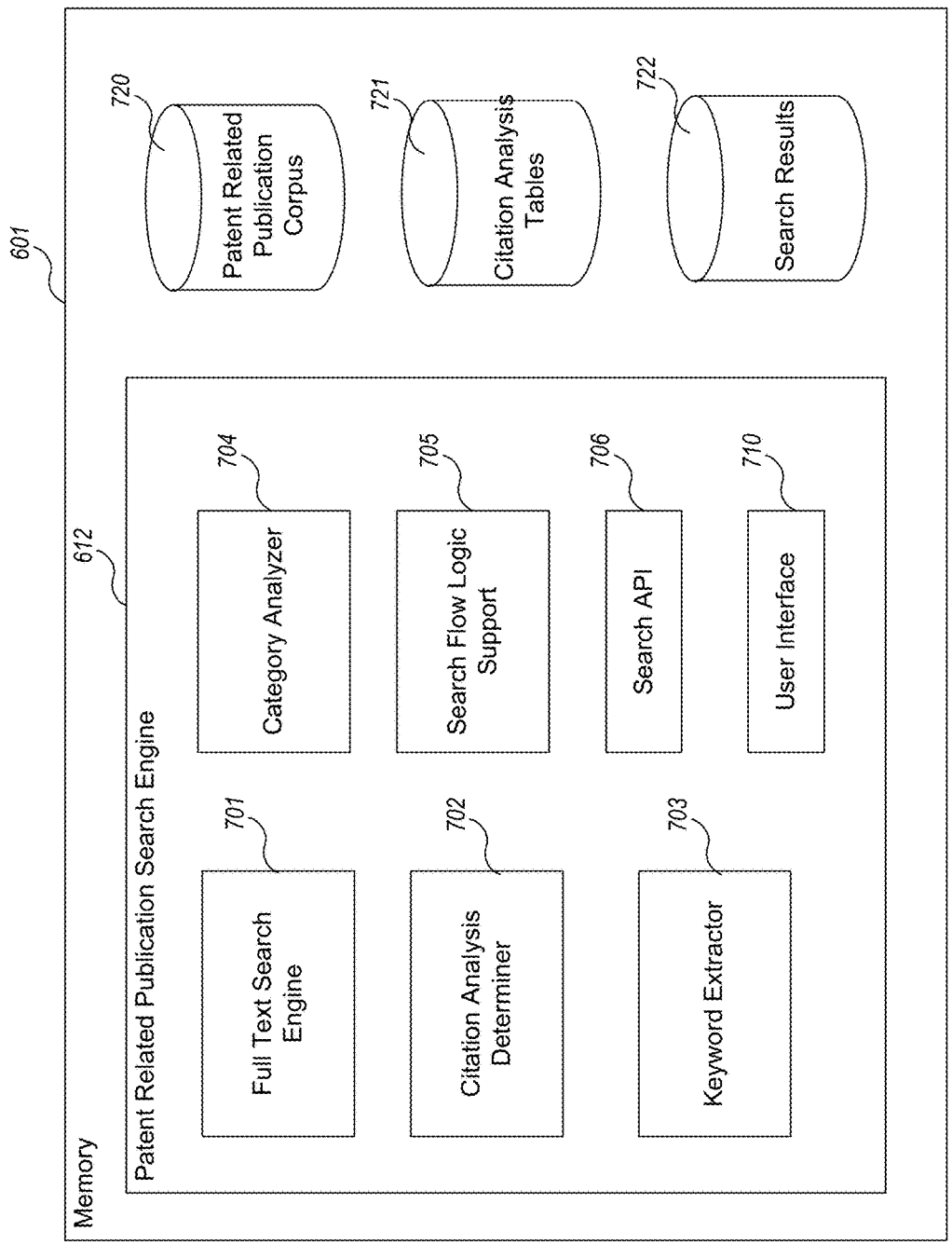
FIG. 7 is an example block diagram of components of an example Patent Related Publication Search Engine.

FIG. 7 is an example block diagram of components of an example Patent Related Publication Search Engine. An example PRPSE 612 comprises a full text search engine 701, a citation analysis determiner 702, a keyword extractor 703, a category analyzer 704, search flow logic support 705, a search API 706, and a user interface 710. The PRPSE 612 may have access to a patent related publication corpus 720, stored either at a remote location, provided by a third party, or provide by the IPIMS environment. The PRPSE 612 also has access to citation tables 721 stored in a data repository that may be used for citation analysis. The citation tables 721 may be implemented as part of the IPIMS, or accessible through other means. For efficiency purposes, they may be pre-computed and updated upon regular intervals, for example, as new publications are added to the corpus 720. Examples of citation tables are described with reference to FIG. 12. The search results data repository 722 is used to store intermediate results and to store any other data needed by the PRPSE 612. PRPSE 612 executes logic as described in FIG. 5 and below with reference to FIGS. 8-10 to implement iterative citation based searches for patent related publications.

For example, referring to FIG. 5, the full text search engine 701 may be used to generate the initial set of patent related publications from inputs 501 and 502 that are stored as part of the intermediate result set 510. The citation analysis determiner 702 may be used to determine relevant patent related publications 507 correlated to the publications in the initial result set 508. The category analyzer 706 may be used to extract categories from a group of indicated patent related publications to produce, for example, the categories available to be selected as categories 504 by a user. The keyword extractor 703 may be used to initially determine what keywords 502 are in the input 501 and may be used to determine additional relevant keywords 506 from matching patent related publications. The search flow support logic 705 may be used in conjunction with user interface 710 to implement search logic in response to user commands. Other uses for these modules also are contemplated.

Note that a general purpose or a special purpose computing system suitably instructed may be used to implement a PRPSE. Further, example PRPSEs may be implemented in software, hardware, firmware, or in some combination to achieve the capabilities described herein. In FIG. 7, the PRPSE 612 is shown in memory 601 (as described with reference to FIG. 6). In other examples, some portion of the contents, some of, or all of the components of the PRPSE 612 may be stored on and/or transmitted over the other computer-readable media, such as other computer-readable media 605 in FIG. 6. The components of the PRPSE 612, preferably execute on a computer processor, such as CPU 603 in FIG. 6. The data repositories 720, 721, and 722, shown here as separated (as opposed to FIG. 6), also reside in the memory 601, and preferably execute on one or more CPUs 603. Of note, one or more of the components in FIG. 7 may not be present in any specific implementation. For example, some example PRPSE 612 embedded in other software may not provide a category analyzer 705. Each block shown may represent one or more such blocks as appropriate to a specific example or may be combined with other blocks. Moreover, the various blocks of the PRPSE 612 may physically reside on one or more machines, which use standard (e.g., TCP/IP) or proprietary interprocess communication mechanisms to communicate with each other.

In example IPIMS environments, components/modules of the IPIMS 610 of FIG. 6 and/or the PRPSE 612 in FIG. 7 are implemented using standard programming techniques. However, a range of programming languages known in the art may be employed for implementing such examples, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The examples described above may also use known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some examples are illustrated as executing concurrently and asynchronously and communicating using message passing techniques. Equivalent synchronous examples are also supported by an IPIMS and a PRPSE.

In addition, programming interfaces to the data stored as part of the IPIMS 610 (e.g., in the data repositories 615 and 616) can be available by standard means such as through C, C++, C#, and Java APIs; libraries for accessing files, databases, or other data repositories; through scripting languages such as XML; through query languages such as SQL; or through Web servers, FTP servers, or other types of servers providing access to stored data. The data repositories 615 and 616 may be implemented as one or more database systems, file systems, or any other method known in the art for storing such information, or any combination of the above, including implementation using distributed computing techniques.

Also an example IPIMS 610 may be implemented in a distributed environment comprising multiple, even heterogeneous, computer systems and networks. For example, in one example, the SSME 613, the PRPSE 612, and the data repositories 615 and 616 are all located in physically different computer systems. In another example, various modules of the IPIMS 610 and the PRPSE 612 are hosted each on a separate server machine and may be remotely located from the tables which are stored in the repositories 615 and 616. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated examples in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an IPIMS and of a PRPSE.

Furthermore, in some examples, some or all of the components of the IPIMS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the components and/or data structures may be stored on tangible storage mediums. Some or all of the system components and data structures may also be transmitted in a non-transitory manner via generated data signals (e.g., as part of a carrier wave or other analog or digital propagated signal) on a variety of computer-readable transmission mediums, such as media 605, including wireless-based and wired/cable-based mediums, and may take a variety of forms (e.g., as part of a single or multiplexed analog signal, or as multiple discrete digital packets or frames). Such computer program products may also take other forms in other examples. Accordingly, example IPIMSes and PRPSEs of this disclosure may be practiced with other computer system configurations.

As described in FIGS. 1-7, one of the functions of a IPIMS is to invoke the PRPSE to facilitate iterative searches for patent related publications using a PRPSE.

Figure 8:
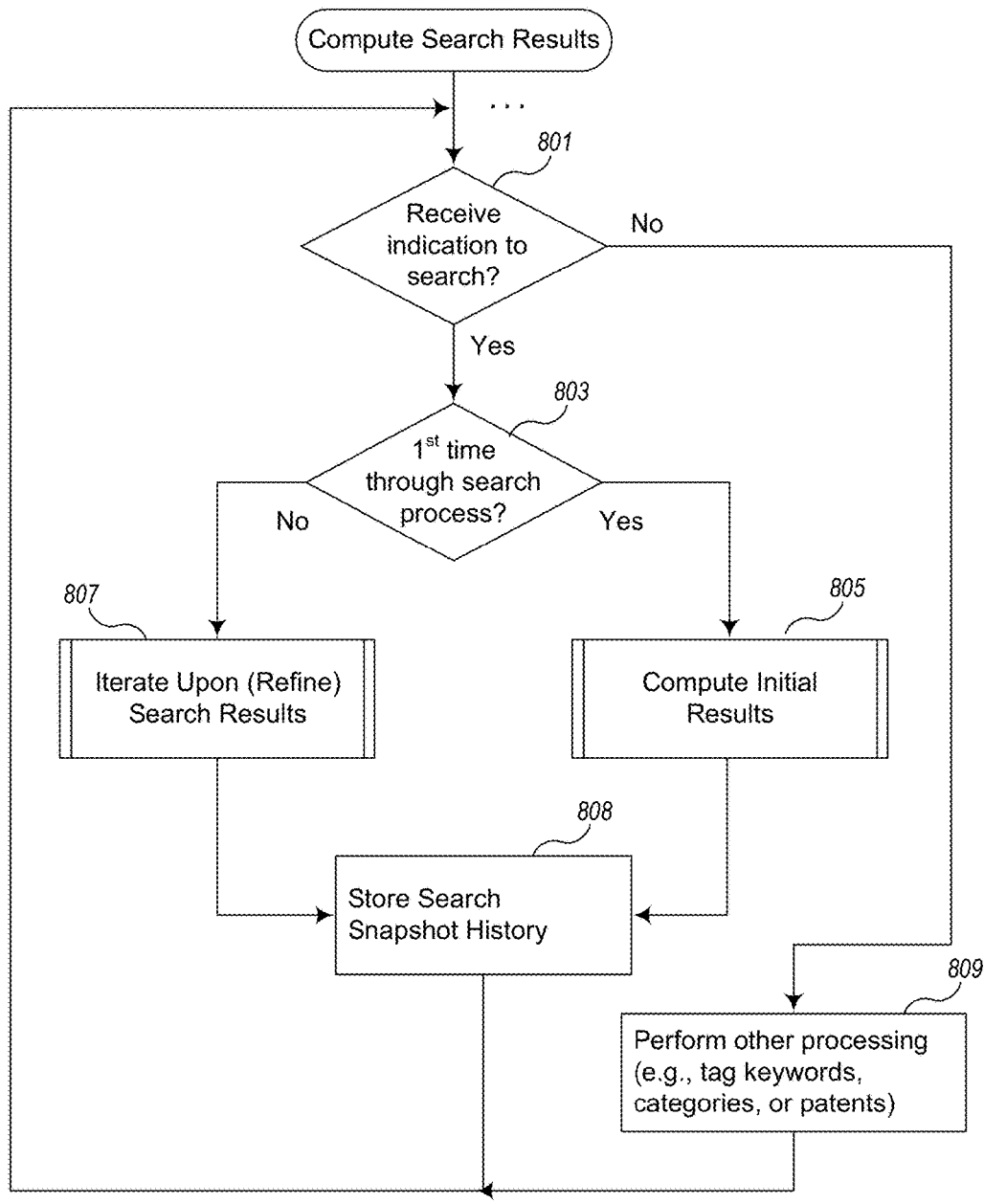
FIG. 8 is an example flow diagram of example code logic implemented by an example Patent Related Publication Search Engine to compute iterative search results.

FIG. 8 is an example flow diagram of example code logic implemented by an example Patent Related Publication Search Engine to compute iterative search results. For example, the logic described by FIG. 8 may be implemented by the search flow logic support 705 of a patent related publication search engine 612 of FIG. 7. Blocks 801-809 implement a continuous event loop responsive to input requests. In particular, in block 801, the logic determines whether it has received an indication to search, and if not, continues to block 809 to perform other processing, such as tagging keywords, categories, or patent related publications, otherwise continues to block 803. In block 803, the logic determines whether it is processing a $1^{st}$ time through a search (a new search) and if so, continues in block 805 to compute initial search results as described with reference to FIG. 9, otherwise continues in block 807 to iterate upon, hence refine, the previously obtained search results as described with reference to FIG. 10. Once the search results are obtained, the logic continues in block 808 to store search history, for example, to support an undo operation. Search history may be stored using persistent search snapshot objects. Such objects support the viewing and reload of prior search results as well as distribution operations, merging, forking, and the like. The logic then continues back to the beginning of the event loop in block 801 to wait for the next event.

Figure 9:
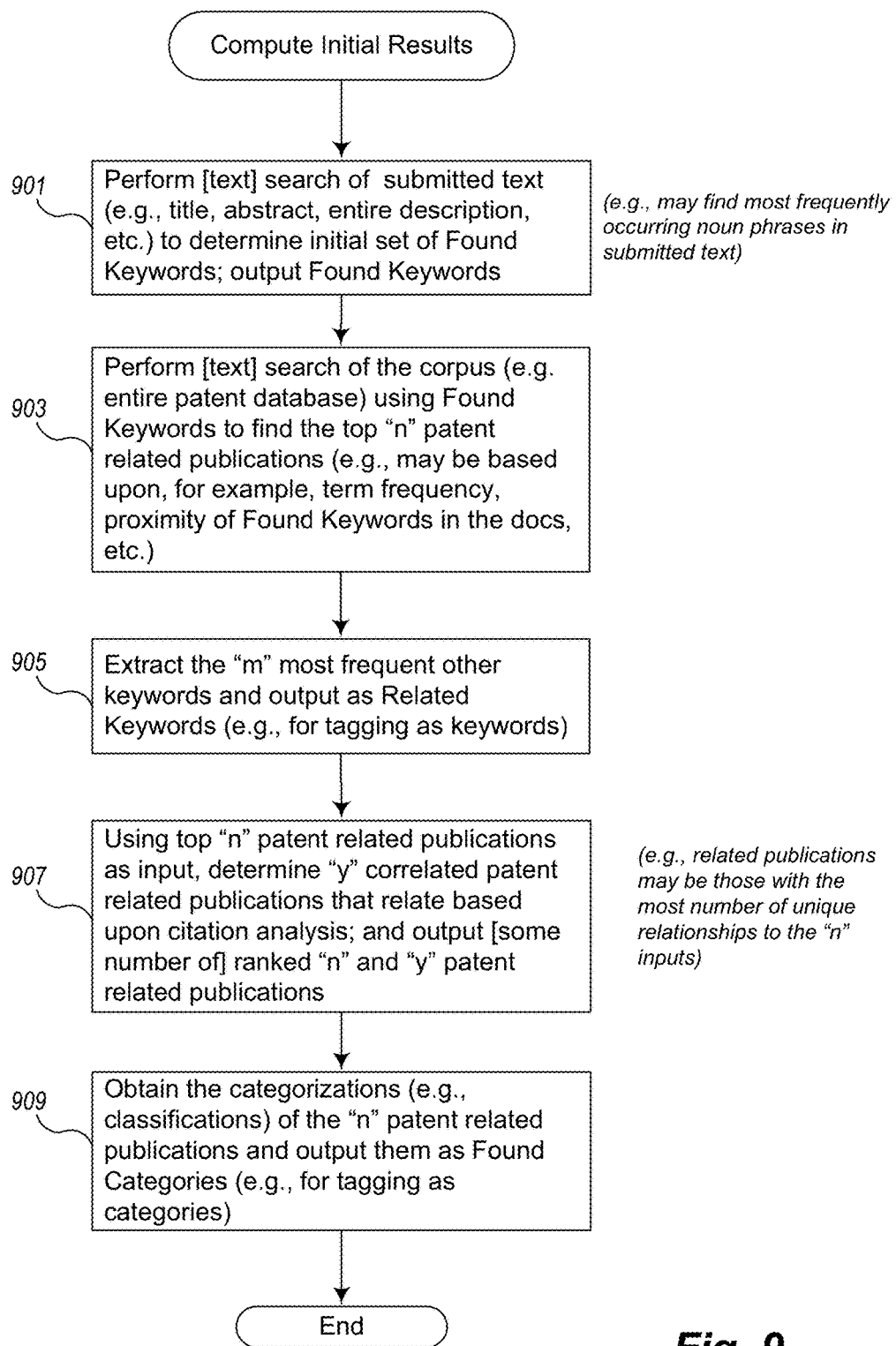
FIG. 9 is an example flow diagram of example code logic implemented by an example Patent Related Publication Search Engine to compute initial search results.

FIG. 9 is an example flow diagram of example code logic implemented by an example Patent Related Publication Search Engine to compute initial search results. For example, the logic described by FIG. 9 may be implemented by the search flow logic support 705 of a patent related publication search engine 612 of FIG. 7. In block 901, the logic performs full text searching of any indicated input text, to determine an initial set of found keywords, and to provide indicators to the found keywords for outputting, for example, via user interface 710. In one example PRPSE, the full text searching of the input is performed via a semantic search engine, which parses and grammatically interprets the input text to find the most relevant keywords (words and phrases) in the text. In some examples, only nouns and noun phrases are used, while in other examples verbs and verb phrases are also used. In other examples, the input text is combed for the most frequently occurring words and phrases, potentially taking into account their proximity in publications found in the corpus. In some examples, the full text search engine 701 implements this logic and may be provided external to the IPIPMS. In other examples, term frequency/inverse document frequency (TF/IDF) search algorithms are used to derive this initial set of found keywords. Once the found keywords are output, for example, to a user, they can be tagged for further iterations.

In block 903, the logic performs a full text search of the entire patent related publication corpus (such as corpus 720) using the found keywords from block 901 to determine the top "n" patent related publications that incorporate these keywords. For example, "n" may be a limit such as 100 imposed to reduce the time it takes to provide search results. This determination may also be made using the full text search engine 701 and may use TF/IDF techniques as well as semantic ones. The logic may determine "n" publications that use the most of the found keywords, use them in the most proximity, or the like. In any case, indications to the "n" publications most related to the found keywords are provided.

In block 905, the logic extracts the "m" most frequent keywords in these "n" publications that are not already in the list of found keywords, for example using keyword extractor 703. Such keywords may be considered related to the input and may provide a list of words and/or phrases that are synonyms for those already present in the input text.

In block 907, the logic determines "y" patent related publications that are correlated with the "n" publications based upon their relationships via citation analysis, for example using the citation analysis determiner 702. For example, "y" may be a limit such as 100 imposed to reduce the time it takes to provide search results. Citation analysis uses the citation tables 721 to analyze which publications (other than those already in the set of "n") are most densely and uniquely related to the set of "n" publications. In example PRPSEs, citations from the face of patent publications that list backward references are used, as well as forward citations where a subsequent patent publication cites back to an antecedent one. In some example PRPSEs, the citation tables store both types of information. In addition, some example PRPSEs also use cross-reference sections of related applications as citations, because the publications of related applications are likely to be informative. An example of citation analysis and the determination of related publications is described with reference to FIGS. 11 and 12.

Once the "y" publications are determined, the logic provides indications to the "n" (resulting from full text searching) and "y" correlated (resulting from citation analysis) publications. The logic may combine the "n" and "y" lists in a variety of ways including sorting them numerically or zipper sorting them (one consecutive from each list), ranking them by some measure of relative important or best correlation to the input data and/or tagged items (e.g., by examining their category information), or by other means. In other examples, the "n" and "y" lists are not combined. In one example, the PRPSE returns indications to all "n" and all "y". In other examples, the PRPSE returns some number of a combined result.

In block 909, the logic obtains the categorizations (e.g., classifications) of the "n" patent related publications, for example, using the category analyzer 704. In some example PRPSEs, indications to these categories are output as "found categories," which may indicate that they directly relate to publications found by full text searches based upon the input text. In other example PRPSEs, categories of the "y" correlated publications are also returned, either combined with the found categories or as separate indications. Categories of the publications may be tagged for use with further search iterations.

In some examples, categories may be used to filter patent related publications to exclude those in indicated categories or to include those of indicated categories (dependent upon the interface). In other examples, tagged categories are used to automatically increase the set of patent related publications used as a basis for determining correlated publications using citation analysis.

Figure 10:
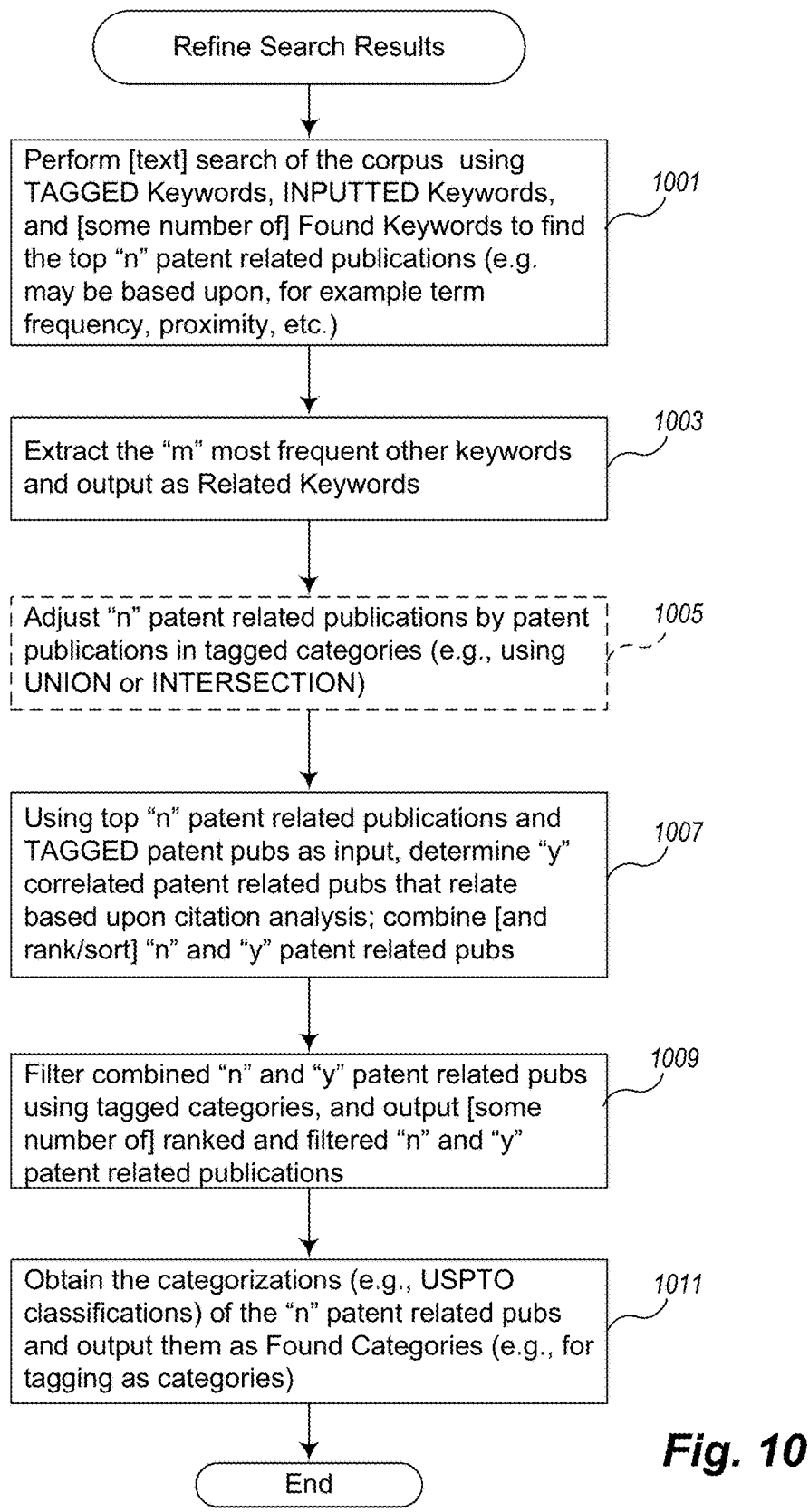
FIG. 10 is an example flow diagram of example code logic implemented by an example Patent Related Publication Search Engine to refine search results upon successive iterations.

FIG. 10 is an example flow diagram of example code logic implemented by an example Patent Related Publication Search Engine to refine search results upon successive iterations. For example, the logic described by FIG. 10 may be implemented by the search flow logic support 705 of a patent related publication search engine 612 of FIG. 7. This logic may be called from FIG. 8 in block 807 in response to an event indicating that a request to refine the search has been received. Thus, in example PRPSEs, possibly some keywords, patent related publications, and/or categories have been selected (e.g., tagged) before the logic of FIG. 10 is invoked.

Specifically, in block 1001, the logic performs full text searching of the corpus of patent related publications (e.g., corpus 720) for any indicated tagged keywords or keywords otherwise input and some number of other keywords, such as some portion of the found keywords, to determine an initial set of (the top "n") patent related publications that incorporate these keywords. In some examples, the number of keywords is limited by the number usable in external search engines such as for performing federated searches. For example, the tagged and inputted keywords may be first used, followed by some number of found keywords, until a limit is reached. In other examples, all of the tagged, inputted, and found keywords are used. As described with reference to FIG. 9, "n" may be an imposed limit and the search algorithm may incorporate any variety of techniques that use semantic analysis, TF/IDF, proximity, or the like.

In block 1003, the logic extracts the "m" most frequent keywords in these "n" publications that are not already in the list of found keywords, for example using keyword extractor 703. Such keywords may be considered related to the input and may provide a list of words and/or phrases that are synonyms for those already present in the input text.

As described earlier, in some example PRPSEs, the tagged categories are used to supplement the intermediate result set (here "n" patent related publications) with publications belonging to the tagged categories. Block 1005, indicated as optional, performs this logic, using for example, the category analyzer 704. Note that such publications may be joined with the "n" publications with a UNION operation (include all) or with an INTERSECTION operation—that is, only include publications that appear both in the list generated using the tagged category and the list of "n" publications. In the case of using a UNION operation, the number of publications will likely expand. In the case of using an INTERSECTION operation the number of publications may decrease (depending upon which and how many categories are tagged).

In block 1007, the logic determines "y" patent related publications that are correlated with the "n" publications (as adjusted using the category analyzer) AND with any tagged patent related publications based upon their relationships via citation analysis, for example using the citation analysis determiner 702. As described with reference to FIG. 9, "y" may be an imposed limit and the citation analysis may take any of the forms described.

Once the "y" publications are determined, the logic provides indications to the "n" (resulting from full text searching) and "y" correlated (resulting from citation analysis) publications. The logic again may combine the "n" and "y" lists in a variety of ways including sorting them numerically or zipper sorting them (one consecutive from each list), ranking them by some measure of relative important or best correlation to the input data and/or tagged items (e.g., by examining their category information), or by other means. In one example, the PRPSE returns indications to all "n" and all "y". In other examples, the PRPSE returns some number of a combined result.

In some example PRPSEs, the categorization information may be used to filter (and possibly rank) the resulting "n" and "y" lists. In block 1009, the logic performs this task, outputting indications to some number of potentially ranked and/or filtered "n" and "y" patent related publications.

In block 1011, the logic obtains the categorizations (e.g., classifications) of the "n" patent related publications, for example, using the category analyzer 704. In some example PRPSEs, indications to these categories are output as "found categories". In other example PRPSEs, categories of the "y" correlated publications are also returned, either combined with the found categories or as separate indications. Categories of the publications may be tagged for use with further search iterations.

Figure 11:
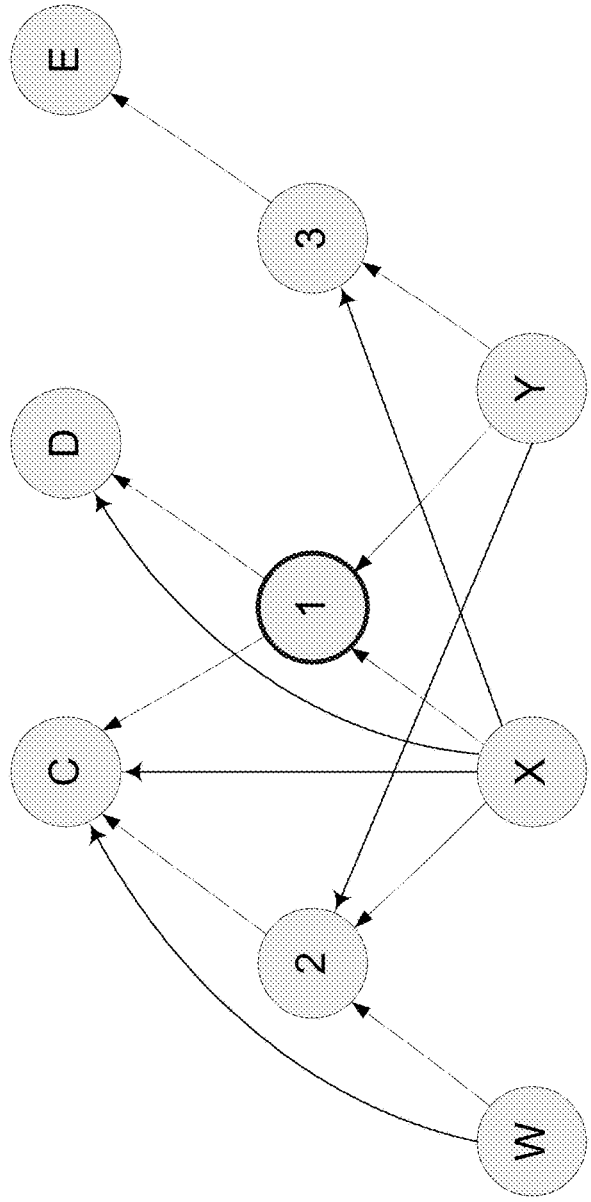
FIG. 11 is an example graph that illustrates example asset relationships for evaluation using citation analysis.

FIG. 11 is an example graph that illustrates example asset relationships for evaluation using citation analysis. Each circle (node) in FIG. 11 represents a patent related publication (or other IP asset). Hence, for example, IP asset W contains backward references to both assets 2 and C. Thus, by implication, asset 2 has a forward reference (is cited by)

asset W. Similarly, asset 1 has inbound paths, indicating that it is cited both other assets (e.g., x and y) and outbound paths, indicating that it cites (backward references) assets C and D.

In an example PRPSE, the citation analysis determiner 702 is implemented to recognize and count each unique citation path between two assets. The relationships between assets (here publications) are sorted by those that are unique and most in number (the most dense) and the assets that are highest after the sort and not present in the tagged and "n" lists of patent related publications (hence new) are returned as correlated patent related publications. In other examples, the citation analysis determiner 702 is implemented without or with less regard to duplicates.

FIG. 12 is an example table illustrating an excerpt of the citation analysis that may be performed upon the relationships of assets demonstrated in FIG. 11. This type of citation analysis is used by the PRPSE to determine the "y" correlated patent related publications (that are not also part of the "n" publications or that tagged ones). The citation table 1200, such as citation tables 721, is pre-computed in some example PRPSEs. Each citation table N00 lists, for each patent identifier 1201 (which, in the United States is an issued patent), a related patent identifier 1202 (which may be a patent publication or a patent application publication) and the number of unique paths 1203 between the related patent identifier 1202 and the patent identifier 1201. Auxiliary table 1220 is present merely to explain the citation paths discoverable from FIG. 11. Note that in the example shown, only direct references and one level of indirect references are considered. Thus, the path shown in FIG. 11 from X to C to 1 to D is not a valid path from X to D because it hops too many nodes (two levels of indirection). In contrast, the path from C to 1 to D is a valid path from C to D because it involves only one level of indirection. Different example PRPSEs may employ different rules.

As such, all of the valid citation relationships for patent identifier "2" are expressed in rows 1205 and those for identifier "1" expressed in rows N06. Referring to the first row 1204, the number of unique citation paths between patent identifier "2" and related patent identifier "X" are 2, show in FIG. 11 as "X" directly cites "2" and "X" directly cites "C" which is cited by "2" (one level of indirection). Observing the excerpted table, related patent identifiers "1," "2," and "C" emerge as the most dense and these publications would theoretically bubble to the top of the correlated patent related publication list providing they are not also publications that were tagged or determined in the full text search (the "n" publications).

Other techniques for performing citation analysis to discover the "y" correlated patent related publications may also be incorporated.

Figure 13:
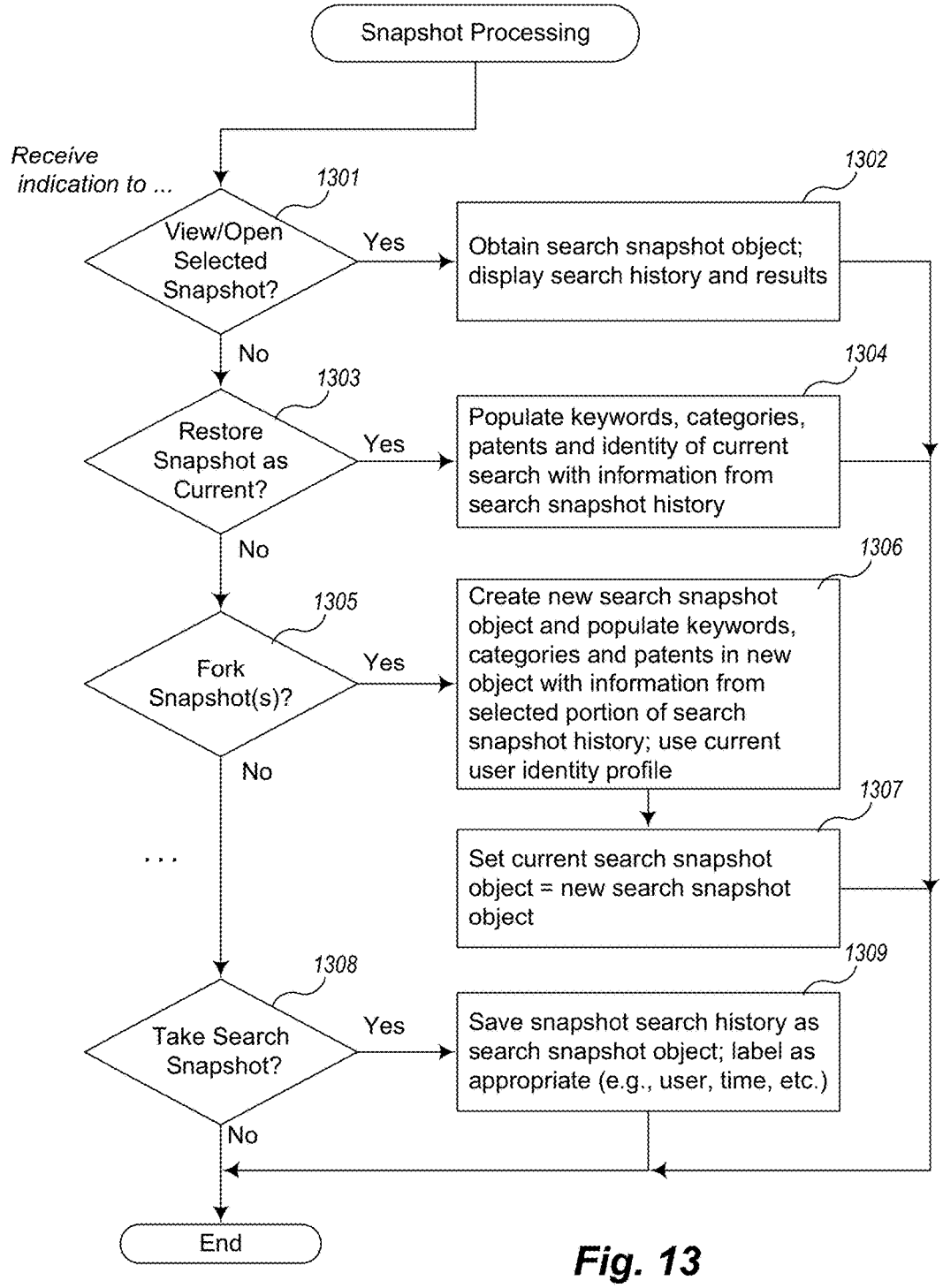
FIG. 13 is an example flow diagram of example code logic implemented by an example Search Snapshot Management Engine to process search snapshots.

FIG. 13 is an example flow diagram of example code logic implemented by an example Search Snapshot Management Engine to process search snapshots. For example, this logic may be implemented by the search snapshot management engine 613 of IPIMS 610. FIG. 13 illustrates an event loop for processing input (e.g., from a user or otherwise) indicating activity is desired involving one or more search snapshot objects. Only some of the various activities described with reference to FIGS. 4B-C are considered herein. Others may be implemented in a similar fashion.

More specifically, in block 1301, the logic determines if it has received an indication to view or "open" a selected snapshot and, if so, continues in block 1302, otherwise continues in block 1303. The logic commences in block 1302 to obtain (e.g., to load or otherwise retrieve from storage) the snapshot object corresponding to the selected snapshot and to display the search history and results as appropriate for the user interface. The logic then continues to the end to enable the next input event to be processed.

In block 1303, the logic determines if it has received indication to restore the search snapshot (e.g., its corresponding object) as the current search iteration and, if so, continues in block 1304, otherwise continues in block 1305. The logic then continues to the end to enable the next input event to be processed. In block 1304, the logic populates the current search state with the keywords, categories, and patent related publication indicators from the designated search snapshot history, in such a manner that a user can continue another search iteration from that point forward. (The search snapshot history is correspondingly adjusted.) The logic then continues to the end to enable the next input event to be processed.

In block 1305, the logic determines whether a new snapshot has been requested, and, if so, continues in block 1306, otherwise continues in block 1308. In block 1306, the logic creates a new search snapshot object and populates it with information (e.g., keywords, categories, patent related publication indicators, etc.) from selected portions of the search snapshot history and identifies the new snapshot with the current user's identity profile. In block 1307, the logic sets the current search snapshot to the newly created one updating any appropriate state information of the SSME. The logic then continues to the end to enable the next input event to be processed.

After processing potentially other input events, in block 1308, the logic determines whether a new search snapshot (of the current search iteration) has been requested, and, if so, continues in block 1309, otherwise continues to the end to enable the next input event to be processed. In block 1309, the log saves the snapshot search history of the current search state as a search snapshot object, labels it appropriately, and then continues to the end to enable the next input event to be processed. Other types of input (or other) events may be incorporated as appropriate.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing it will be appreciated that, although specific examples have been described herein for purposes of illustration, various modifications may be made without deviating from the spirit and scope of the invention. For example, the methods, techniques, and systems for performing citation analysis searching discussed herein are applicable to other architectures other than a client-server architecture. Also, the methods, techniques, and systems discussed herein are applicable to differing protocols, communication media (optical, wireless, cable, etc.) and devices (such as wireless handsets, tablets, electronic organizers, personal digital assistants, portable email machines, game machines, pagers, navigation devices such as GPS receivers, etc.).

The invention claimed is:

1. An automated method in a computing system for facilitating cooperative and/or competitive searches for publications, comprising:
generating a search result snapshot history representation that is a data structure comprising a plurality of nodes that represent search result snapshot objects, each search result snapshot object storing data that corresponds to search results of a specific iteration of a search project, storing data sufficient to restore the specific iteration, and comprising a forward reference and a backward reference, wherein at least some of the plurality of search result snapshot objects are linked to some other of the plurality of search result snapshot objects through the respective forward and backward references of each of the linked search result snapshot objects, and wherein at least two of the plurality of search result snapshot objects have been produced to correspond to search iterations by different individuals or entities; and sharing the generated search result snapshot history between a plurality of different individuals and/or entities.

2. The method of claim 1 wherein each iteration of the search project produces keywords and identifications of publications as outputs from one or more keywords and one or more identifications of publications.

3. The method of claim 1, further comprising:
receiving a designation of one of the plurality of search result snapshot objects; and
adding a new search result snapshot object to the search result history by inserting a link from the designated one of the plurality of search result snapshot objects to the new search result snapshot object, thereby inserting a fork in the search result snapshot history.

4. The method of claim 1, further comprising:
receiving a designation of a plurality of the search result snapshot objects; and
merging the search results that correspond to each of the designated search result snapshot objects into a merged search result snapshot object.

5. The method of claim 4, further comprising:
constructing a new search result snapshot history from the merged search result snapshot object.

6. The method of claim 1, further comprising:
receiving a designation of one or more of the plurality of search result snapshot objects; and
constructing a new search result snapshot history from the designated search result snapshot objects.

7. The method of claim 6 wherein the new search result snapshot history is bundled with input text to which the search pertains.

8. The method of claim 7 wherein the input text is at least one of an invention disclosure, a patent, and/or another intellectual property asset.

9. The method of claim 1, further comprising:
persistently storing the generated search result snapshot history data structure.

10. The method of claim 1 wherein the sharing the generated search result snapshot history comprises sharing the generated search result snapshot history between a plurality of different individuals and/or entities that are performing search iterations at locations remote and separate from each other.

11. The method of claim 1 wherein the sharing the generated search result snapshot history comprises sharing the generated search result snapshot history between members of a team.

12. The method of claim 1, further comprising:
receiving a designation of one or more of the plurality of search result snapshot objects; and
associating one or more ratings with each of the designated search result snapshot objects.

13. The method of claim 1, further comprising:
receiving a designation of one or more of the plurality of search result snapshot objects; and
associating comments with each of the designated search result snapshot objects.

14. The method of claim 1 wherein sharing the generated search result snapshot history comprises at least one of viewing stored data of at least one of the search result snapshot objects, editing stored data of at least one of the search result snapshot objects, and/or adding a search result snapshot object to and/or restoring search result snapshot objects from the generated search result snapshot history.

15. The method of claim 1, further comprising:
facilitating providing incentives and/or rewards based upon the shared search result snapshot history.

16. The method of claim 15 wherein the facilitating providing incentives and/or rewards provides an incentive to one or more members of a team who contribute to search result snapshot objects that are part of or later added to the shared search result snapshot history.

17. The method of claim 16 wherein the incentives and/or rewards are directed to members who find the closest literature to an input text that forms the basis for the search project.

18. The method of claim 16 wherein the incentives and/or rewards are directed in a pro-rata manner to members who contribute search result snapshot objects to a path of the search result snapshot history that results in a knock-out reference.

19. The method of claim 16 wherein the incentives and/or rewards are directed to members of the team that generate search result snapshot objects that are close to a calibration search result.

20. The method of claim 16 wherein the incentives and/or rewards are directed to members of the team that generate search result snapshot objects that help identify an invention for which a patent application has not yet been applied for.

21. The method of claim 16, wherein the search result history contains at least one search result snapshot object that is contributed by a member of the team and contains at least one search result snapshot object that is contributed by an individual and/or an entity that is not a member of the team, and further comprising:
filtering the shared search result snapshot history to render only ones of the plurality of search result snapshot objects that have been contributed by the members of the team.

22. The method of claim 1 wherein the search project is a search for patent related publications.

23. The method of claim 1, further comprising:
causing a rendering of a representation of the shared generated search result snapshot history.

24. The method of claim 1 wherein the representation comprises branches and nodes, each node representing one of the plurality of search result snapshot objects.

25. A computer-readable computer memory medium selected from the group consisting of: application-specific integrated circuits, standard integrated circuits, field-programmable gate arrays, complex programmable logic devices, hard disks, and memory, wherein the computer-readable computer memory medium is storing or executing instructions that, when executed on computer processor, facilitates searches for publications, by performing a method comprising:
generating a search result snapshot history representation that is a data structure comprising a plurality of nodes that represent search result snapshot objects, each search result snapshot object storing data that corresponds to search results of a specific iteration of a search project, storing data sufficient to restore the specific iteration, and comprising a forward reference and a backward reference, wherein at least some of the plurality of search result snapshot objects are linked to some other of the plurality of search result snapshot objects through the respective forward and backward references of each of the linked search result snapshot objects, and wherein at least two of the plurality of search result snapshot objects have been produced to correspond to search iterations by different individuals or entities; and sharing the generated search result snapshot history representation between a plurality of different individuals and/or entities.

26. The computer-readable computer memory medium of claim 25 wherein each iteration of the search project produces keywords and identifications of publications as outputs from one or more keywords and one or more identifications of publications.

27. The computer-readable computer memory medium of claim 25, the method further comprising:
receiving a designation of one of the plurality of search result snapshot objects; and
adding a new search result snapshot object to the search result history representation by inserting a link from the designated one of the plurality of search result snapshot objects to the new search result snapshot object.

28. The computer-readable computer memory medium of claim 25, the method further comprising:
receiving a designation of a plurality of the search result snapshot objects; and
merging the search results that correspond to each of the designated search result snapshot objects into a merged search result snapshot object.

29. The computer-readable computer memory medium of claim 28, the method further comprising:
constructing a new search result snapshot history representation from the merged search result snapshot object.

30. The computer-readable computer memory medium of claim 25, further comprising:
receiving a designation of one or more of the plurality of search result snapshot objects; and
constructing a new search result snapshot history representation from the designated search result snapshot objects.

31. The computer-readable computer memory medium of claim 30 wherein the new search result snapshot history representation is bundled with input text to which the search pertains.

32. The computer-readable computer memory medium of claim 31 wherein the input text is at least one of an invention disclosure, a patent, and/or another intellectual property asset.

33. The computer-readable computer memory medium of claim 25, the method further comprising:
persistently storing the generated search result snapshot history representation.

34. The computer-readable computer memory medium of claim 25 wherein the sharing the generated search result snapshot history representation comprises sharing the generated search result snapshot history representation between members of a team.

35. The computer-readable computer memory medium of claim 25, the method further comprising:
receiving a designation of one or more of the plurality of search result snapshot objects; and
associating ratings with each of the designated search result snapshot objects.

36. The computer-readable computer memory medium of claim 25, the method further comprising:
receiving a designation of one or more of the plurality of search result snapshot objects; and
associating comments with each of the designated search result snapshot objects.

37. The computer-readable computer memory medium of claim 25, the method further comprising:
facilitating providing incentives and/or rewards based upon the shared search result snapshot history representation.

38. The computer-readable computer memory medium of claim 37 wherein the facilitating providing incentives and/or rewards provides an incentive to one or more members of a team who contribute to search result snapshot objects that are part of or later added to the shared search result snapshot history.

39. The computer-readable computer memory medium of claim 37 wherein the incentives and/or rewards are directed to members who find the closest literature to an input text that forms the basis for the search project.

40. The computer-readable computer memory medium of claim 37 wherein the incentives and/or rewards are directed in a pro-rata manner to members who contribute search result snapshot objects that results in a knock-out reference to a patent related asset.

41. The computer-readable computer memory medium of claim 37 wherein the incentives and/or rewards are directed to members of the team that generate search result snapshot objects that are similar to a calibration search result as determined by a threshold value.

42. The computer-readable computer memory medium of claim 37 wherein the incentives and/or rewards are directed to members of the team that generate search result snapshot objects that help identify an invention for which a patent application has not yet been applied for.

43. The computer-readable computer memory medium of claim 25 wherein the search project is a search for patent related publications.

44. The computer-readable computer memory medium of claim 25 wherein the search result snapshot history representation comprises branches and nodes, each node representing one of the plurality of search result snapshot objects.

45. A computing system comprising:
a computer memory;
a computer processor: and
a search snapshot management engine having code logic for maintaining a history of iterations of a search project, stored in the computer memory and configured, when executed by the computer processor, to:
generate a search result snapshot history representation that is a data structure comprising a plurality of nodes that represent search result snapshot objects, each search result snapshot object storing data that corresponds to search results of a specific iteration of a search project, storing data sufficient to restore the specific iteration, and comprising a forward reference and a backward reference, wherein at least some of the plurality of search result snapshot objects are linked to some other of the plurality of search result snapshot objects through the respective forward and backward references of each of the linked search result snapshot objects, and wherein at least two of the plurality of search result snapshot objects have been produced to correspond to search iterations by different individuals or entities; and
transmit the generated search result snapshot history to a plurality of individuals and/or entities.

46. The computing system of claim 45 wherein the transmitted search result snapshot history is provided to a team of individuals to review search results.

47. The computing system of claim 45 wherein the search result snapshot history is transmitted to interested parties including one or more of an individual with expertise in a designated area, an inventor, a reviewer, or an investor.

48. The computing system of claim 45 wherein the search result snapshot history is provided as part of an invention disclosure.

49. The computing system of claim 45 wherein a plurality of the search result snapshot objects of the search result snapshot history are designated and the designated snapshot objects are used to create a supplemental search history.

\* \* \* \* \*